(12) United States Patent
Shimotono et al.

(10) Patent No.: US 7,813,074 B2
(45) Date of Patent: *Oct. 12, 2010

(54) MAGNETIC DISK PROTECTION MECHANISM, COMPUTER SYSTEM COMPRISING PROTECTION MECHANISM, PROTECTION METHOD FOR MAGNETIC DISK, AND PROGRAM FOR PROTECTION METHOD

(75) Inventors: Susumu Shimotono, Hadano (JP); Tetsuya Noguchi, Yamato (JP); Mitsuru Ogawa, Hadano (JP); Akiyoshi Tanaka, Sagamihara (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/106,955

(22) Filed: Apr. 21, 2008

(65) Prior Publication Data
US 2008/0259496 A1    Oct. 23, 2008

Related U.S. Application Data

(60) Division of application No. 11/361,116, filed on Feb. 24, 2006, now Pat. No. 7,382,566, which is a continuation of application No. 10/677,723, filed on Oct. 1, 2003, now Pat. No. 7,042,663.

(30) Foreign Application Priority Data
Oct. 3, 2002    (JP) .............................. 2002-291561

(51) Int. Cl.
*G11B 21/02* (2006.01)
(52) U.S. Cl. ................... 360/75; 360/62; 360/77.02; 360/77.08; 360/78.04

(58) Field of Classification Search ................... 360/48, 360/55, 75, 77.02
See application file for complete search history.

(56) References Cited

U.S. PATENT DOCUMENTS

| | | | | | |
|---|---|---|---|---|---|
| 5,963,392 | A | * | 10/1999 | Sri-Jayantha et al. | 360/75 |
| 5,982,573 | A | * | 11/1999 | Henze | 360/75 |
| 6,018,431 | A | * | 1/2000 | Carlson et al. | 360/60 |
| 6,046,877 | A | * | 4/2000 | Kelsic | 360/75 |
| 6,067,488 | A | * | 5/2000 | Tano | 701/35 |
| 6,101,062 | A | * | 8/2000 | Jen et al. | 360/75 |

(Continued)

FOREIGN PATENT DOCUMENTS

JP    2002/208239    7/2002

(Continued)

OTHER PUBLICATIONS

Japanese Office Action from application No. 2003-306161 mailed on Dec. 9, 2008.

*Primary Examiner*—Dismery E Mercedes
(74) *Attorney, Agent, or Firm*—Zilka-Kotab, PC

(57) ABSTRACT

A mechanical transport device includes a system for transport; and a hard disk drive attached to the system. The hard disk drive comprises a magnetic recording disk to record data, a head to read or write the data to or from the disk, and a drop sensor designed to sense a shock condition. The system for transport may be a vehicle such as a car. Additional systems are also presented.

19 Claims, 14 Drawing Sheets

U.S. PATENT DOCUMENTS

| | | | |
|---|---|---|---|
| 6,236,527 B1 * | 5/2001 | Uchiike et al. | 360/75 |
| 6,453,266 B1 * | 9/2002 | Chainer et al. | 702/184 |
| 6,510,014 B2 * | 1/2003 | Kikuta et al. | 360/60 |
| 6,721,122 B2 * | 4/2004 | Aikawa et al. | 360/77.02 |
| 6,738,214 B2 * | 5/2004 | Ishiyama et al. | 360/75 |
| 6,754,029 B2 * | 6/2004 | Ito | 360/75 |
| 6,771,449 B1 * | 8/2004 | Ito et al. | 360/75 |
| 6,965,487 B2 * | 11/2005 | Hanada et al. | 360/69 |
| 6,967,804 B1 * | 11/2005 | Codilian | 360/75 |
| 7,191,089 B2 * | 3/2007 | Clifford et al. | 702/141 |
| 7,428,119 B2 * | 9/2008 | Kuroki et al. | 360/75 |
| 2002/0027733 A1 * | 3/2002 | Kikuta et al. | 360/60 |
| 2002/0043114 A1 * | 4/2002 | Fujino et al. | 73/862.68 |
| 2003/0067705 A1 | 4/2003 | Ishiyama et al. | 360/75 |

FOREIGN PATENT DOCUMENTS

| | | |
|---|---|---|
| JP | 2002/259066 | 9/2002 |
| JP | 2002/100180 | 4/2008 |

* cited by examiner

```
IF (W > TH) THEN
        INSTRUCT MAGNETIC HEAD TO ESCAPE ON THE
        BASIS OF A SHOCK PREDICTION
        START ESCAPE TIMER
ELSE IF (W > TH/2) THEN
        NOTIFY THAT OPERATION MODE HAS SHIFTED TO
        HIGH RISK MODE
        START HIGH RISK MODE TIMER
ENDIF
```

FIGURE 8

```
IF    (ESCAPE TIMER TIMES OUT)           THEN
   IF (W < TH/4) THEN
      INSTRUCT MAGNETIC HEAD TO RETURN
   ENDIF

ENDIF
IF    (HIGH RISK MODE TIMER TIMES OUT)   THEN
   IF (W < TH/8) THEN
      NOTIFY THAT OPERATION MODE HAS SHIFTED TO
      NORMAL MODE
   ENDIF
ENDIF
```

FIGURE 9

MAGNETIC DISK PROTECTION MECHANISM, COMPUTER SYSTEM COMPRISING PROTECTION MECHANISM, PROTECTION METHOD FOR MAGNETIC DISK, AND PROGRAM FOR PROTECTION METHOD

RELATED APPLICATIONS

This application is a divisional of U.S. patent application Ser. No. 11/361,116, filed Feb. 24, 2006, now U.S. Pat. No. 7,382,566 which is of continuation of U.S. patent application Ser. No. 10/677,723, filed Oct. 1, 2003, now U.S. Pat. No. 7,042,663 and also claims priority from Japanese Patent Application No. 2002-291561, filed Oct. 3, 2002, all of which are incorporated by reference.

FIELD OF THE INVENTION

The present invention relates to a magnetic disk device protection mechanism, and in particular, to a mechanism that protects a magnetic disk from a shock effected when a magnetic disk device moves.

BACKGROUND OF THE INVENTION

For a portable information processing apparatus such as a notebook type computer, it is an important object to protect the information processing apparatus from a shock effected if the apparatus is inadvertently dropped or jarred while being carried or operated. In particular, the structure of a magnetic disk device commonly used as a storage device for an information processing apparatus of this kind is susceptible to a shock or vibration. It is thus desirable to provide an effective protection mechanism.

The magnetic disk device causes a magnetic head to seek a rotating magnetic disk to write or read data to or from the disk. Accordingly, if the magnetic head collides against the magnetic disk, the magnetic disk may be damaged to hinder part or all of the data from being restored. Therefore, the shock resistant performance of the magnetic disk device can be improved by causing the magnetic head to "escape" from the magnetic disk before a shock or vibration occurs.

As a protection mechanism of this kind for the conventional magnetic disk device, the magnetic disk device comprises a sensor for detecting that the magnetic disk device is inclined, and an escape control means for determining that the magnetic disk device is inclined on the basis of a detection signal from the sensor, to move the magnetic head to an escape area. In this case, the inclination of the magnetic disk device is detected as a sign of fall of the magnetic disk device to cause the magnetic head to escape from the magnetic disk (for example, refer to Patent Document 1, below).

Further, the magnetic disk device has hitherto been provided with a self-diagnosis function as its protection mechanism. A typical self-diagnosis function is a S. M. A. R. T. (Self-Monitoring Analysis and Reporting Technology) which provides various information on a spin up time, write errors, a seek rate, and temperature and which can predict the possibility of a failure (for example, refer to Non-Patent Document 1, below).

[Patent Document 1]
Published Unexamined Japanese Patent Application No. 2629548 (p. 1 to 3, FIG. 1)

[Non-Patent Document 1]
"Information Technology—AT Attachment with Packet Interface—5 (ATA/ATAPI-5)", [online], Feb. 29, 2000, Technical Committee T13, (p. 39 to 41).

According to the conventional technique described in Patent Document 1, the magnetic head escapes if an output from a pressure sensor that detects a change in the weight of the magnetic disk device indicates that a portable terminal apparatus in which the magnetic disk device is mounted is markedly inclined or that the apparatus has started to fall. However, this escape condition is abstract and is not definite. Accordingly, it is undeniable that there is a possibility of detecting the inclination of the portable terminal apparatus which does not actually lead to a fall to unnecessarily cause the magnetic head to escape as in the case in which, for example, a notebook type computer is used on a user's lap. In this case, every time the portable terminal apparatus is inclined, the magnetic head escapes from the magnetic disk. Consequently, in a practical sense, this conventional technique hinders the apparatus from being easily operated.

Further, Patent Document 1 does not describe any conditions for returning the magnetic head if it has been mistakenly caused to escape.

Further, the S. M. A. R. T.-based self-diagnosis function for the magnetic disk device does not determine whether or not a particular shock has damaged the magnetic disk device but evaluates faults using accumulated statistical information on the whole magnetic disk device. Accordingly, the S. M. A. R. T. self-diagnosis provides only such information as indicates that the incidence of an error or the like has exceeded a threshold, indicating that a failure is likely to occur. Furthermore, even if a shock to the magnetic disk device damages part of a magnetic recording area on the magnetic disk device, the presence of this damaged area cannot be noticed until the area is accessed if the S. M. A. R. T. is used in a normal manner.

It is thus an object of the present invention to provide a magnetic disk device protection mechanism which allows a magnetic head escape condition to be set in detail and which is thus effective and practical.

It is another object of the present invention to provide a self-diagnosis for determining, if the magnetic disk device is shocked, whether or not the shock has damaged the magnetic disk device.

SUMMARY OF THE INVENTION

To accomplish the above objects, an aspect of the present invention is implemented as a magnetic disk protection mechanism characterized by comprising an information acquisition mechanism for acquiring information about an environmental change of a magnetic disk device; a shock prediction mechanism for analyzing the information acquired by the information acquisition mechanism together with a history thereof, and for determining a status where the magnetic disk device is used, so as to perform a shock prediction; and a control mechanism for controlling operations of the magnetic disk device including a magnetic head escape operation based on a prediction result by the shock prediction mechanism.

Specifically, the status of where the magnetic disk device is used is represented as the inclination or shaking of the housing of a magnetic disk device or an information processing apparatus to which the magnetic disk device is mounted. This status is determined from an acceleration effected in the magnetic disk device or the like and detected by an acceleration sensor provided in the magnetic disk device or the like. This acceleration includes linear acceleration and angular acceleration. Furthermore, the linear acceleration includes static acceleration (gravity acceleration) that varies depending on the position of the acceleration sensor and dynamic acceleration generated by force other than the gravity acting on the magnetic disk device or the like.

More preferably, if the status where the magnetic disk device is used varies in a predetermined pattern, the shock prediction mechanism predicts that a shock will be caused by the variation in status. To determine if a variation occurs in the shock prediction, history of input operation by a predetermined input device such as a keyboard or mouse may be referred to. On the other hand, if a variation in the status where the magnetic disk device is used falls within a specified range for a specified period, the shock prediction mechanism does not predict that a shock will be caused by the variation in status.

Further, after the magnetic head has escaped, if the shock prediction mechanism determines that the magnetic disk device is stable, that is, it determines that a stationary status or a similar status involving position changes within a specified range has lasted for a specified period, then the shock prediction mechanism notifies the control mechanism that the magnetic disk device is stable. Upon receiving this notification, the control mechanism returns the escaping magnetic head. In this case, a reference for the determination by the shock prediction mechanism (return condition) can be suitably adjusted based on information on the status of the information processing apparatus present before a shock is predicted to occur, i.e. a history of the information acquired by the information acquiring mechanism.

Furthermore, after the magnetic head has escaped, the control mechanism holds a new access request to the magnetic disk device in an internal queue instead of realizing the access request until the shock prediction mechanism determines that the magnetic disk device is stable. This prevents the magnetic head from returning while the magnetic disk device is unstable. It is further possible to prevent the toss of access requests made while the magnetic disk device is unstable.

Another aspect of the present invention is implemented as a magnetic disk protection mechanism comprising a status determination mechanism for determining a status where a magnetic disk device is used, and a control mechanism for controlling operations of the magnetic device including a magnetic head escape operation based on a determination result by the status determination mechanism, wherein, when the status determination mechanism finds the high probability of excessive shock to the magnetic disk device, the control mechanism divides an access request to the magnetic disk device into access requests with a small data size per access and transmits to the magnetic disk device.

Furthermore, according to another aspect of the present invention, when the status determination mechanism finds the high probability of excessive shock to the magnetic disk device, the control mechanism can invalidate a write cache function comprised in the magnetic disk device to make an access to the magnetic disk.

Moreover, when data is written in a cache memory, the control mechanism can write, instead of invalidating the write cache function, the written data on a magnetic disk so as to empty the cache memory.

The magnetic disk protection mechanism according to the present invention can be adapted to predict the occurrence of a shock to have the magnetic head escape as described above. However, it can also be adapted to operate if a shock actually occurs, to check whether or not the magnetic head escape could have been completed before the occurrence of such a shock, to carry out diagnosis as to whether or not the magnetic head may have collided against and damaged the magnetic disk. The magnetic disk protection mechanism is characterized by comprising a shock prediction mechanism for predicting a possible shock to the magnetic disk device, based on a variation in an environment of the magnetic disk device; a control mechanism for controlling operations of the magnetic disk device including a magnetic head escape based on a prediction result by the shock prediction mechanism; and a diagnosis mechanism for operating if a shock actually occurs after said control mechanism has started causing the magnetic head to escape, to determine whether or not the magnetic head escape has been completed before the occurrence of the shock.

More specifically, the diagnosis mechanism makes the determination by comparing a pre-shock period that is a time from a start of an escape operation of the magnetic head until the occurrence of a shock with an already measured and restored escape time required for the escape operation of the magnetic head. Further, if the magnetic head has already escaped before the magnetic head starts an escape operation under the control of the control mechanism, the diagnosis mechanism does not compare the pre-shock period with the escape time but determines that the magnetic head has completely escaped before the occurrence of the shock. In this case, if the control mechanism issues a request command requesting the magnetic head to perform an escape operation under the control of the control mechanism and then within a specified time, acquires a notification indicating that the command has been completed, then the diagnosis mechanism determines that the magnetic head had already escaped when it started an escape operation.

Moreover, the magnetic disk protection mechanism notifies the user of a diagnosis result obtained by the diagnosis mechanism and indicating whether or not the magnetic head may have collided against and damaged the magnetic disk. The magnetic disk protection mechanism thus prompts the user to execute a recovery process such as data backup.

Further, to accomplish the above objects, another aspect of the present invention is implemented as a computer system comprising the above described magnetic disk device. Further another aspect of the present invention is implemented as a program for controlling a computer to realize the functions of the above described magnetic disk protection mechanism. This program can be provided by distributing a magnetic or optical disk, a semiconductor memory, or other recording medium in which the program is stored or by distributing the program via a network.

Furthermore, to accomplish the above object, the present invention is implemented as a magnetic disk protection method of protecting a magnetic disk by using a sensor to determine a status where a magnetic disk device is used and by having a magnetic head escape depending on a determination result. This magnetic disk protection method is characterized by accumulating information histories acquired by the sensor, analyzing accumulated histories and the latest sensor information to recognize a change pattern of the magnetic disk device status, and based on a content of the change pattern of the magnetic disk device status, executing the magnetic head escape when a shock to the magnetic disk device is predicted.

Further, another magnetic disk protection method according to the present invention is characterized by comprising the steps of, based on an output by the sensor, determining a status where the magnetic disk device is used, controlling operations of division of an access request to the magnetic disk device into access requests with a small data size per access and of transmission to said magnetic disk device when the high possibility of excessive shock to the magnetic disk device is found, and executing a magnetic head escape when an excessive shock to the magnetic disk device is predicted.

Furthermore, the method may comprise, instead of the step of dividing the above described access request into smaller access requests, a step of controlling operations so as to invalidate a write cache function in the magnetic disk device to make an access to the magnetic disk when it is found that there is a high probability of an excessive shock to the magnetic disk device.

Moreover, instead of invalidating the write cache function, at each data write in a cache memory in said magnetic disk device, the data may be written to a magnetic disk so as to empty the cache memory.

Further, the present invention is also implemented as a magnetic disk protection method such as the one described below. With this magnetic disk protection method, based on a variation in an environment of the magnetic disk device, a possible shock to the magnetic disk device is predicted. Then, based on a result of the prediction, operations of the magnetic disk device including a magnetic head escape are controlled. Then, if a shock actually occurs after the magnetic head has started escaping, it is determined whether or not the magnetic head escape has been completed before the occurrence of the shock, by comparing a pre-shock period that is a time from a start of an escape operation of the magnetic head until the occurrence of a shock with an already measured and restored escape time required for the escape operation of the magnetic head.

These operations enable diagnosis as to whether or not the magnetic head may have collided against and damaged the magnetic disk.

According to the present invention thus configured, an effective and practical magnetic disk device protection mechanism is provided which monitors the status of a magnetic disk device or an information processing apparatus in which a magnetic disk device is mounted, to control an operation of causing a magnetic head to escape on the basis of a magnetic head escape condition set in detail.

Further, according to the present invention, if the magnetic disk device or the like is unstable, preparations are made to enable the magnetic head escaping operation to be promptly performed.

Moreover, according to the present invention, self-diagnosis is implemented in which if the magnetic disk device is actually shocked, it is determined whether or not the shock has damaged the magnetic disk device. The user is notified of a diagnosis result and thus prompted to execute a recovery process such as data backup as required. Thus, if the magnetic disk has been actually damaged, it is possible to avoid a secondary fault in which the magnetic head collides against the magnetic disk to scrape the coated magnetic surface of the disk, and subsequently the resultant fine fragments of the surface further damage the surface of the disk while the magnetic disk is operating, resulting in loss of more data.

In a yet further embodiment of the present invention, a mechanical transport device includes a system for transport; and a hard disk drive attached to the system. The hard disk drive comprises a magnetic recording disk to record data, a head to read or write the data to or from the disk, and a drop sensor designed to sense a shock condition. The system for transport may be a vehicle such as a car.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 8 is a view showing an example of an operation algorithm used by the escape condition calculating section shown in FIG. 7;

FIG. 9 is a view showing an example of an operation algorithm used by the return condition calculating section shown in FIG. 7;

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention will be described below in detail on the basis of the embodiment shown in the accompanying drawings.

First, the present invention will be described in brief. The present invention is intended for an information processing apparatus comprising a magnetic disk device as a storage device, notably a portable information processing apparatus such as a notebook type computer or a handheld computer. According to the present invention, if there is a possibility that the information processing apparatus will fall, this is predicted to cause a magnetic head to escape from a magnetic disk. This makes the magnetic disk device more resistant to a shock occurring when the information processing apparatus actually falls. To accomplish this, a change in the status of the information processing apparatus such as its inclination or vibration is monitored and analyzed to detect a sign of its possible fall according to the present invention. Further, if a sign of a fall is detected, a preliminary process is executed during a data transfer process to promptly perform an operation of causing the magnetic head to escape.

Moreover, according to the present invention, if the information processing apparatus is actually shocked, self-diagnosis is carried out on the basis of information obtained by, for example, monitoring a change in the status. The self-diagnosis checks whether or not the escape operation of the magnetic head was performed in time, in other words, whether or not the shock may have damaged the magnetic disk device.

Figure 1:
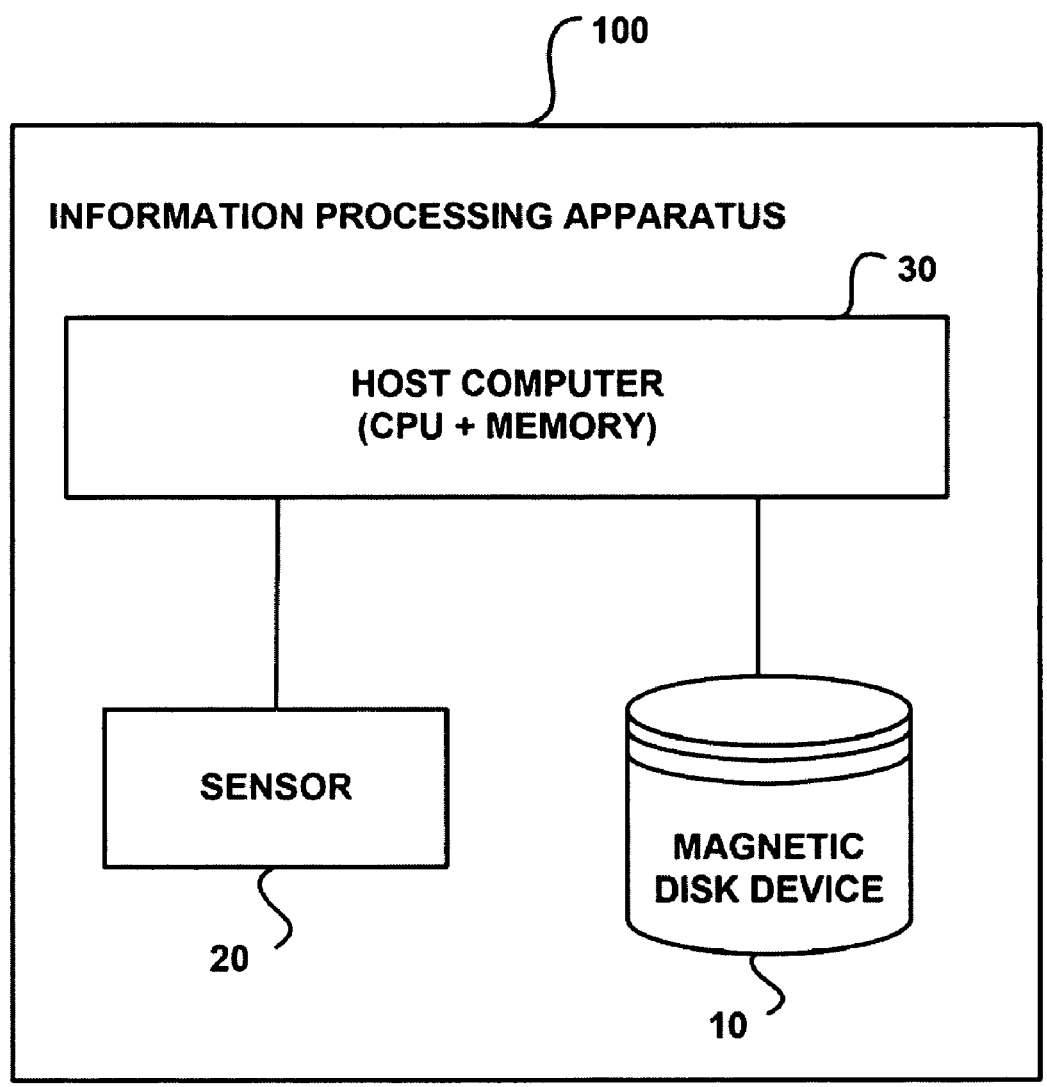
FIG. 1 is a view showing a configuration of an information processing apparatus to which a magnetic disk device protection mechanism according to the present invention is applied.
Figure 2:
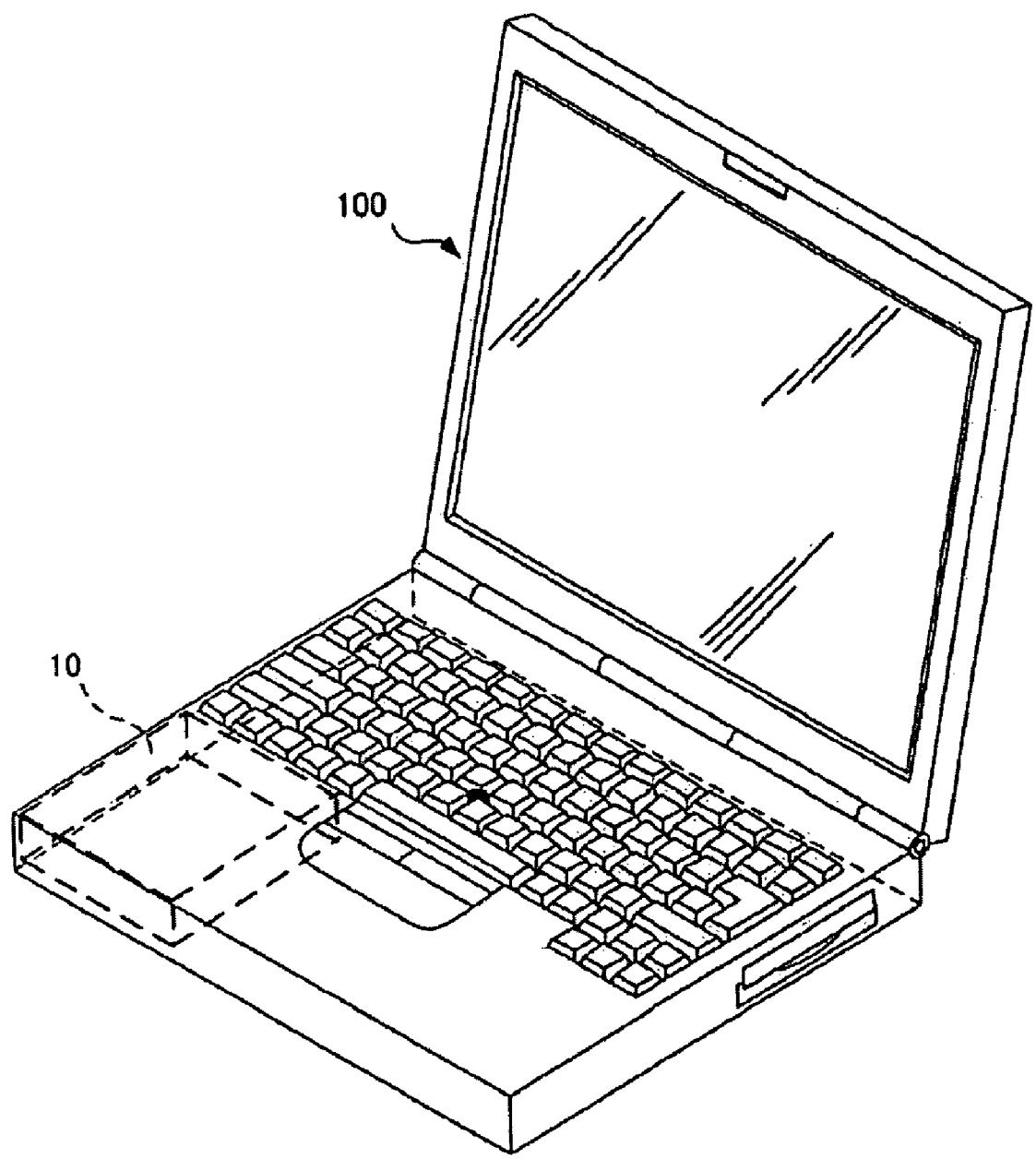
FIG. 2 is a view showing the appearance of the information processing apparatus to which the magnetic disk device protection mechanism according to the present invention can be applied.

FIG. 1 is a block diagram showing a configuration of an information processing apparatus to which a magnetic disk device protection mechanism according to the present embodiment is applied. FIG. 2 is a view showing the appearance of this information processing apparatus.

As shown in FIG. 1, an information processing apparatus 100 according to the present embodiment comprises a magnetic disk device (HDD) 10 as a storage device, a sensor 20 for sensing the inclination or vibration of the information processing apparatus, and a host computer (a CPU and a memory) 30 that controls the magnetic disk device 10 and the sensor 20. In the present embodiment, as shown in FIG. 2, the information processing apparatus 100 is described, by way of example, as an easily portable notebook type computer, with the magnetic disk device 10 installed in a housing of the computer. In this case, the host computer 30 is implemented using a CPU and a main memory both used to process data for the computer itself. Further, the magnetic disk device 10 may be inclined, vibrated, or shocked together with the computer. Accordingly, the sensor 20 may be provided in the magnetic disk device 10 or in the housing of the computer.

Therefore, in the description below, it is a precondition that the information processing apparatus 100 is inclined, vibrated, or shocked. However, it should be appreciated that the present invention is applicable to the case in which the magnetic disk device 10 itself is inclined, vibrated, or shocked, depending on the configuration of the apparatus.

Then, detailed description will be given of a situation that requires the protection mechanism for the magnetic disk device 10.

Figure 3:
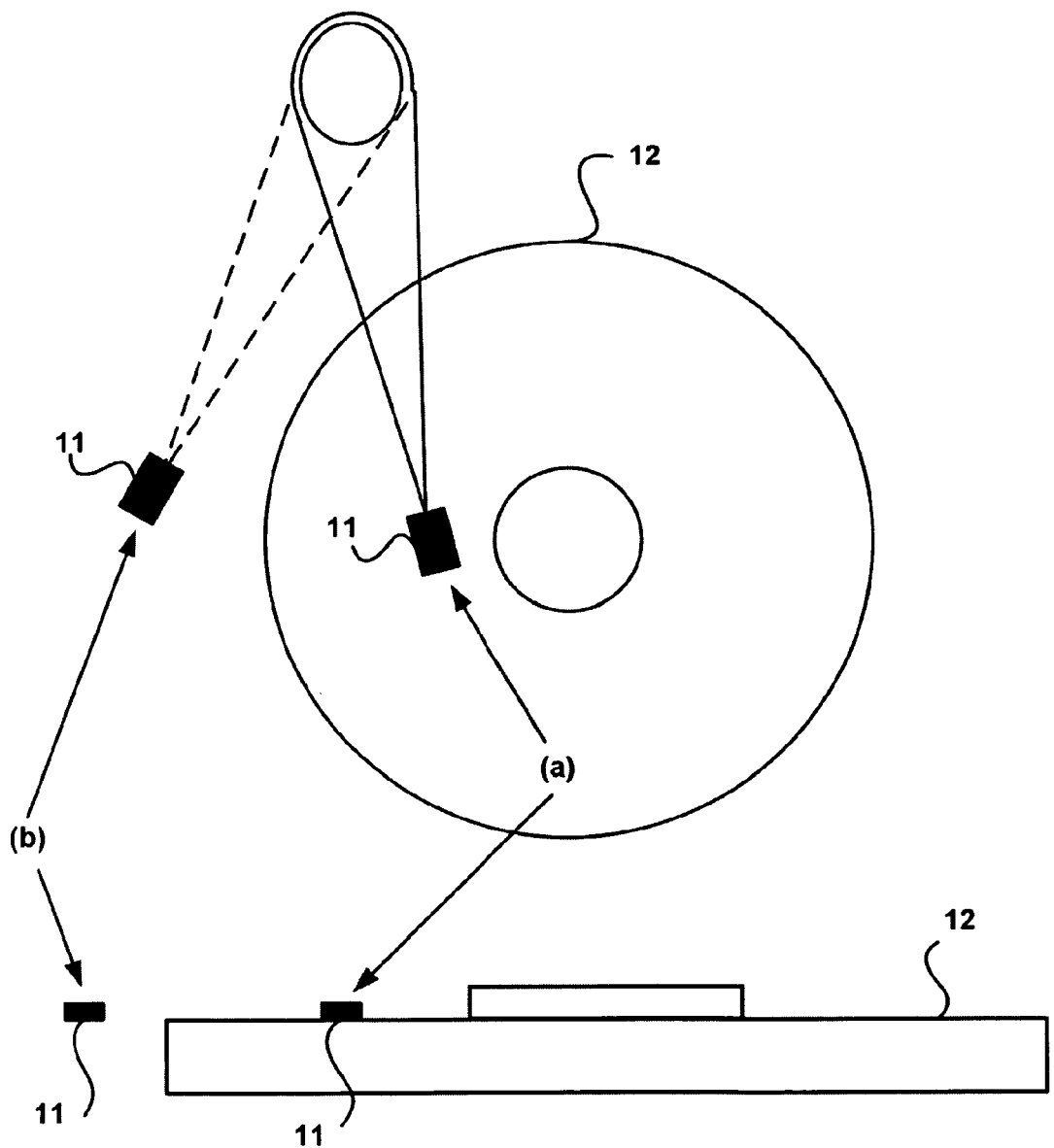
FIG. 3 is a view schematically showing a common configuration of a magnetic disk device.

FIG. 3 is a view schematically showing a general configuration of the magnetic disk device 10.

The structure of the magnetic disk device 10 is more resistant to a shock or vibration when the magnetic head 11 is at a predetermined escape position that is separate from a magnetic disk 12 (unloading: position (b)) than when it is on the magnetic disk 12 (loading: position (a)). Accordingly, if the information processing apparatus 100 is likely to be shocked hard, the shock resistant performance for the magnetic disk device 10 can be improved by causing the magnetic head 11 to escape from the magnetic disk 12 before it is actually shocked.

The information processing apparatus 100 is most frequently shocked hard when it falls from a place such as a desktop or a user's lap where it is used. Thus, it is contemplated that a sign of fall of the information processing apparatus 100 may be detected to cause the magnetic head 11 to escape from the magnetic disk 12 to protect the magnetic disk device 10.

Figure 4:
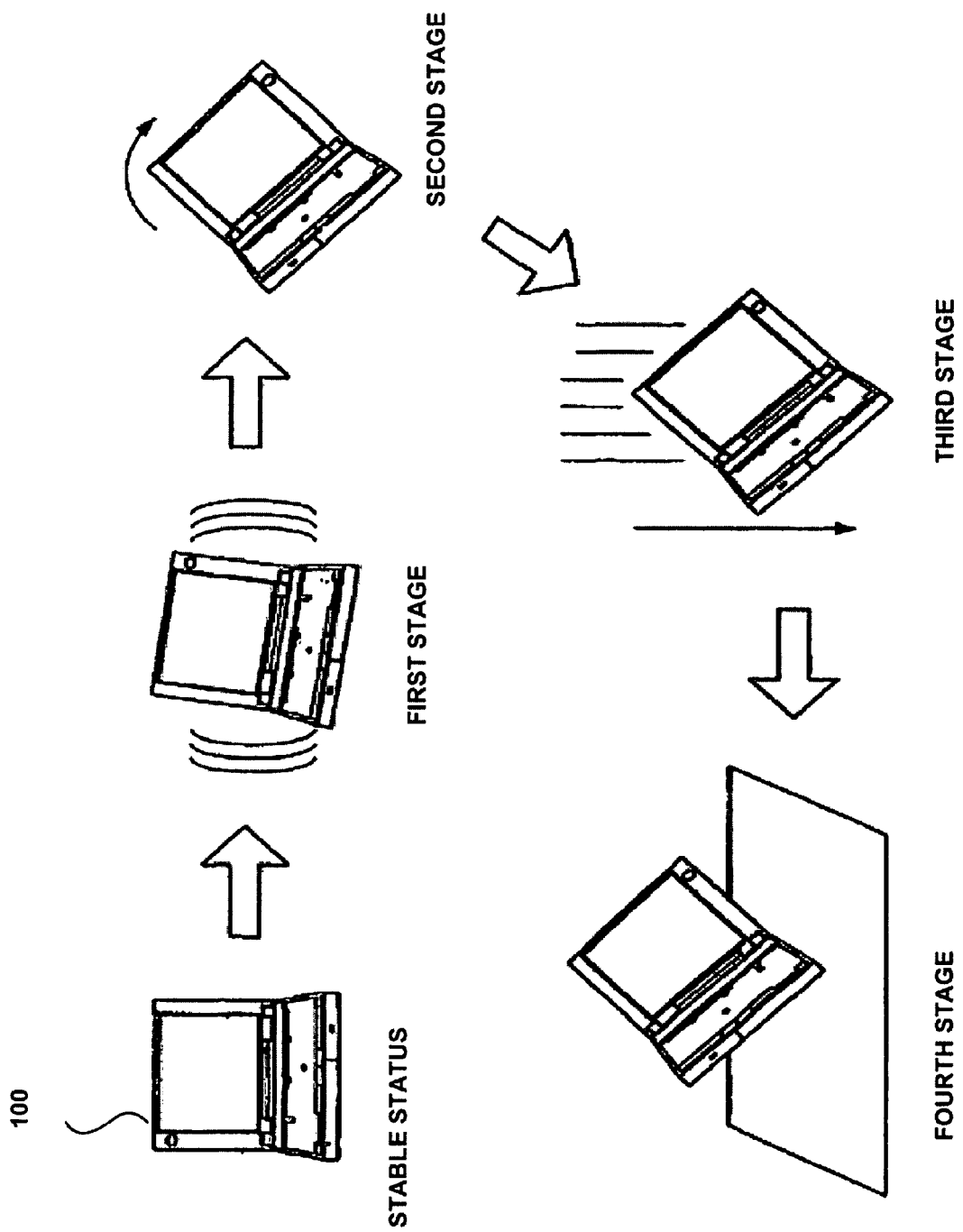
FIG. 4 is a view schematically showing a variation in the status of the information processing apparatus starting with a stable status and ending with the start of a fall.

FIG. 4 is a schematic view showing a variation in the status of the information processing apparatus 100 starting with a stable status and ending with the start of a fall.

As shown in FIG. 4, the information processing apparatus 100, which is stably placed on a desk or the like, is lifted by the user's hands and thus shaken (first stage). Then, as an initial fall operation, the information processing apparatus 100 is shaken harder and starts to rotate (second stage). Then, the information processing apparatus 100 falls freely (third stage). Finally, it collides against a floor or the like and is thus shocked hard (fourth stage).

During this process, the information processing apparatus 100 starts to fall in the second stage. Accordingly, it is preferable to promptly detect that the first stage has shifted to the second stage to start an operation of causing the magnetic head 11 to escape as early as possible. It is assumed that the information processing apparatus 100 is operated on the user's lap. Provided that the height at which the information processing apparatus 100 is operated is 50 cm, the time required for the apparatus 100 to fall from the user's lap onto the floor or the like is about 320 msec. If it is assumed that an initial fall operation during the second stage requires about 150 msec, the time elapsing after the information processing apparatus 100 has started to fall from the user's lap and before it is shocked is about 470 msec.

If the magnetic disk device is a 2.5-inch HDD (Hard Disk Drive), the time required for the magnetic head 11 to escape from the magnetic disk 12 is about 300 msec. Consequently, the magnetic head II can escape successfully before a shock occurs provided that the magnetic head 11 performs the escape operation immediately after the start of the fall (a shift to the second stage). However, in view of actual situation of operation control or data transfer for the magnetic disk device 10, an operation of causing the magnetic head 11 to escape cannot always be started immediately after the start of a fall is detected.

Today, the mechanical structure of the magnetic disk device 10 is standardized to some degree. It is thus difficult to add a special arrangement for forcing the magnetic head 11 to escape from the magnetic disk 12 when a possible fall is detected. Special design for this purpose increases the production cost of the magnetic disk device 10. Therefore, to allow the magnetic head 11 to escape successfully, software, specifically an unload command is preferably used for control as in the case with the control of loading and unloading of the magnetic head 11.

However, an HDC (Hard Disk Controller) of the common magnetic disk device 10 operates in a single task manner. Accordingly, while an operation such as a data write is being performed, it is impossible to respond to the host computer 30. Thus, if the unload command is used to control the escape of the magnetic head 11 and if data is being written to or read from the magnetic disk device 10 when the host computer 30 transmits the unload command to the HDC of the magnetic disk device 10, then the unload command cannot be executed before this process is completed. As a result, the magnetic head 11 cannot escape immediately.

Further, the magnetic disk device 10 commonly comprises a cache memory (a high speed cache) to temporarily retain data to be written to the magnetic disk 12 in this cache (write cache) before the data is written to the magnetic disk 12, which operates at low speeds. This improves the speed at which the magnetic disk device 10 can respond to the host computer 30. Typically, the magnetic head 11 is unloaded after the write data retained in the cache memory (dirty data) has been written to the magnetic disk 12 to flush (empty) the cache memory. Thus, if any dirty data remains in the cache memory of the magnetic disk device 10 when the unload command is transmitted to the HDC of the magnetic disk device 10, the unload command cannot be executed before the cache is flushed. As a result, the magnetic head 11 cannot escape immediately.

As described above, even if the time elapsing after the information processing apparatus 100 has started to fall and before a shock occurs is about 470 msec and the time required for the magnetic head 11 to escape from the magnetic disk 12 is about 300 msec, the magnetic head 11 cannot always escape successfully before a shock occurs. Thus, certain improvements are required to start an operation of causing the magnetic head 11 to escape immediately after the unload command has been issued.

Further, with the protection mechanism for the magnetic disk device 10 according to the present embodiment, as a condition for starting an operation of causing the magnetic head 11 to escape, it must be precisely determined that the first stage has shifted to the second stage as shown in FIG. 4.

The information processing apparatus 100 is more prone to be vibrated or inclined when operated on the user's lap or the like than when operated on a desktop. In this case, if the condition for starting an operation of causing the magnetic head 11 to escape is set to be the marked inclination of the information processing apparatus 100 or its vibration equal to or larger than a specified magnitude, then while the information processing apparatus 100 is being operated on the user's lap, the inclination or vibration of the information processing apparatus 100 occurring when the operator changes his or her own posture or the position of the apparatus 100 may be sensed to cause the magnetic head 11 to escape. Naturally, after the magnetic head 11 has escaped, no data can be written to or read from the magnetic disk device 10. Thus, desired data processing temporarily cannot be executed. Further, if the information processing apparatus 100 is placed on the user's lap or the like and is continuously inclined or vibrated, the operation of the magnetic disk device 10 cannot be recovered. Consequently, data processing cannot be resumed.

Therefore, the inclination or vibration of the information processing apparatus 100 must be analyzed so that the magnetic disk head 11 can be caused to escape after the status of the information processing apparatus 100 has been reliably shifted to the second stage.

As described above, for the protection mechanism for the magnetic disk device 10, it is necessary to cause the magnetic head 11 to escape by precisely determining that the status of the information processing apparatus 100 has shifted from first stage to second stage as shown in FIG. 4. It is also necessary to minimize the time elapsing after the unload command, causing the magnetic head 11 to escape, has been issued and before an actual escape operation is started.

Description will be given of the system configuration and operation of the present embodiment which meets the above described requirements.

Figure 5:
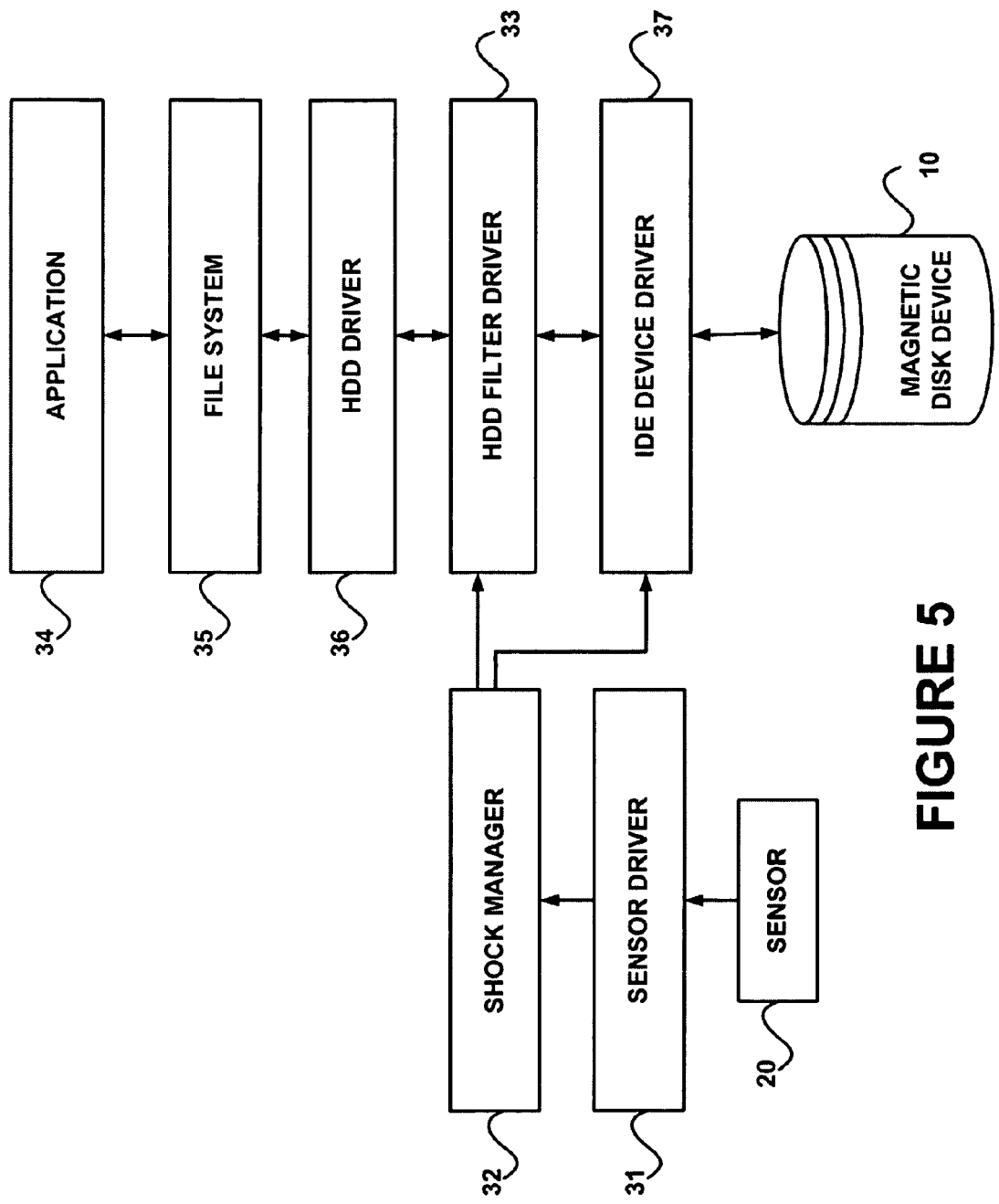
FIG. 5 is a view illustrating a system configuration of the magnetic disk device protection mechanism according to the present invention.

FIG. 5 is a view illustrating the system configuration of the protection mechanism for the magnetic disk device 10 according to the present embodiment.

Referring to FIG. 5, the present embodiment comprises a sensor 20 as an information acquiring mechanism for acquiring information on changes in environment such as inclination and vibration effected on the information processing apparatus 100, a sensor driver 31, a shock manager 32 as an analysis mechanism and shock prediction mechanism for analyzing the information acquired by the sensor 20 to determine the status of the magnetic disk device 10 to predict the occurrence of a shock, and an HDD filter driver 33 as a control mechanism for controlling operations of the magnetic disk device 10 on the basis of result of the determination by the shock manager 32.

The functions of the sensor driver 31, shock manager 32, and HDD filter driver 33 are realized by a program controlled CPU in the host computer 30. The program for controlling the CPU to realize these functions is be provided by distributing a magnetic or optical disk, a semiconductor memory, or other recording medium in which this program is stored or by distributing the program via a network. The program is then stored in the magnetic disk device 10 and loaded into the memory of the host computer 30. The program is then executed by the CPU to realize the functions of the components shown in FIG. 2.

Further, the host computer 30 comprises as typical functions an application 34 for executing various specific processes, a file system 35 provided by an operating system (OS), an HDD driver 36 that actually controls operations of the magnetic disk device 10, and an IDE device driver 37 that controls connections to the magnetic disk device 10. These typical functions of the host computer 30 are realized by the program controlled CPU.

Typically, if the application 34 accesses a data file in the magnetic disk device 10 (a write or a read), the file system 35, provided by the OS, is used. The file system 35 manages the manner in which a data file composed of a chunk of data is actually arranged and saved in the magnetic disk device 10. The file system 35 hides the data file from the application 34 to simplify the use of the magnetic disk device 10 by the application 34. The HDD driver 36 and the IDE device driver 37 actually access the magnetic disk device 10.

The HDD driver 36, which controls the operation of the magnetic disk device 10, connects to the magnetic disk device 10 via a driver corresponding to an interface (IDE (Integrated Drive Electronics), SCSI (Small Computer System Interface), or the like) used to connect the magnetic disk device 10 to the host computer. In the present embodiment, it is assumed that the interface for the magnetic disk device 10 is an IDE and that the IDE device driver 37 is thus used. The HDD driver 36 and the IDE device driver 37 access an I/O controller (for example, an IDE controller) to which the magnetic disk device 10 is connected according to control provided by the file system 35. Then, the HDD driver 36 and the IDE device driver 37 operate a predetermined I/O port in the I/O controller so that the magnetic disk device 10 can transfer data at a high speed according to instructions of the file system 35.

With the above configuration, the sensor driver 31 acquires information on the status of the information processing apparatus 100 from the sensor 20. In the present embodiment, the sensor 20 is an acceleration sensor that detects a variation in acceleration effected on each of two axes (X/Y axes) or three axes (X/Y/Z axes) to provide analog outputs (accelerometer) (a three-axis acceleration sensor will hereinafter be used in the present embodiment). The term "acceleration sensor" as used herein means an inertia sensor that measures linear or angular accelerations. However, in general, the term "accelerometer" often means a linear accelerometer. Further, angular accelerometers include a gyroscope (an angular speed meter). The present invention can be implemented using any of these sensors though their mounting methods differ slightly.

The sensor driver 31 periodically (for example, every 10 msec) acquires constantly outputted acceleration information for each point of time. The acceleration information acquired from the sensor 20 includes a static acceleration (weight acceleration) that varies depending on the position of the sensor 20 (that is, the position of housing of the magnetic disk device 10 or information processing apparatus 100 to which the sensor 20 is fixed) and a dynamic acceleration resulting from force (such as a shock) exerted on the housing of the magnetic disk device 10 or information processing apparatus 100. In general, the sensor 20 outputs a synthesized value for these accelerations.

The shock manager 32 analyzes the acceleration information acquired by the sensor driver 31 and the time when the acceleration occurred (time interval) to calculate the inclination, movement, rotation speed, or acceleration of the information processing apparatus 100 (or the magnetic disk device 10). These calculated values are accumulated in the shock manger 32 for a specified period as the last vibration history.

Further, the shock manager 32 constantly monitors the status (inclination, movement, rotation speed, or acceleration) where the housing of the information processing apparatus 100 is currently used. Then, on the basis of the current status and the history, the shock manager 32 determines whether or not an excessive shock will occur in the near future (a shock prediction).

Now, the functions of the shock manager 32 will be described in detail.

Figure 6:
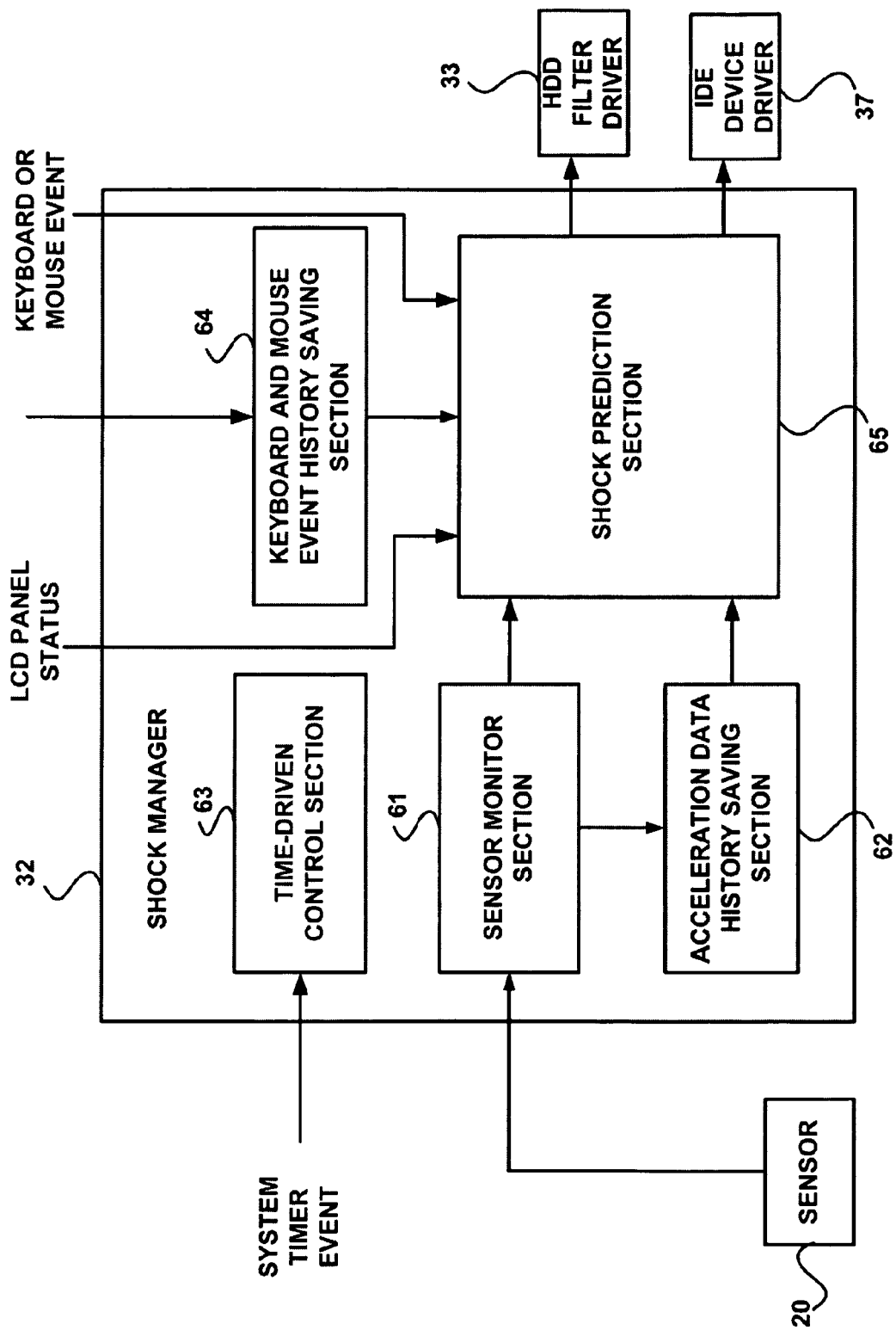
FIG. 6 is a view showing a functional configuration of a shock manager according to the present invention.

FIG. 6 is a view showing a functional configuration of the shock manager 32.

As shown in FIG. 6, the shock manager 32 is a timer driven module periodically run by a system timer. It comprises a sensor monitor section 61, an acceleration data history saving section 62, a time-driven control section 63, a keyboard and mouse event history saving section 64, and a shock prediction section 65.

Every time the sensor monitor section 61 is periodically driven on the basis of a system timer, it acquires an acceleration level for one or all of the three axes (X/Y/Z axes) measured by the sensor 20 at that time. The acceleration level information acquired is used to predict a shock. However, a shock prediction may be carried out on the basis of the acceleration level of a synthesized vector for these axes or may be carried out on each axis and then on the basis of the acceleration level for one of the axes. However, in the latter case, a safe status is determined by a logical AND of determinations for the respective axes. A dangerous status is determined by a logical OR of determinations for the respective axes.

The acceleration data acquired by the sensor monitor section 61 is transmitted to the shock prediction section 65 and the acceleration data history saving section 62.

The acceleration data history saving section 62 saves a history of acceleration sample data for a period sufficiently longer than the time required for a fall, the main cause of a possible shock during a normal operation. For example, if acceleration data corresponding to a 5-second history is sampled at 100 Hz, the number of samples is 500 (=100☐5) on each axis.

The time-driven control section 63 adjusts the actual driving period of the module periodically driven by the system timer or the like. For example, if the information processing apparatus 100 is unstable and is likely to be excessively shocked by its fall or the like (a high risk mode, described later), the time-driven control section 63 provides such control as drives the module at 100 Hz. On the other hand, if the information processing apparatus 100 is stable (a normal mode, described later), the time-driven control section 63 determines that the apparatus need not be frequently monitored and provides such control as carries out monitoring and related calculations at 25 Hz. By thus adaptively adjusting the actual driving period according to the status of the information processing apparatus 100, loads on the host computer 30 can be reduced which are required to determine the status of the information processing apparatus 100 and to detect its fall.

The keyboard and mouse event history saving section 64 records keyboard and mouse events that can be normally acquired as system events, for a specified time (for example, for the past five seconds as in the case with the history of acceleration data).

The status of an LCD panel, i.e. a display device of the information processing apparatus 100 indicates an open or closed status of the panel if the LCD panel can be opened and closed as in the case in which the information processing apparatus 100 is a notebook type computer. The shock prediction section 65 directly acquires this status in order to determine the usage of the information processing apparatus 100 on the basis of the status. For example, if the acceleration data acquired by the sensor monitor section 61 detects a variation in acceleration value, it can be determined that the information processing apparatus 100 is unstably used if the LCD panel is open. On the other hand, if the LCD panel is closed, it can be determined that the information processing apparatus 100 is being carried. In the latter case, the information processing apparatus 100 is likely to be inadvertently dropped. Then, control may be provided such that a shock prediction reference (threshold Th) used by the shock prediction section 65 and described later is lowered to allow the magnetic head 11 to escape successfully by reacting sensitively to a variation in the status of the information processing apparatus 100.

Likewise, events generated by operating the keyboard or the mouse are saved to the keyboard and mouse event history saving section 64. These events are also directly acquired by the shock prediction section 65 and used together with the history information in the keyboard and mouse event history saving section 64 to determine the usage of the information processing apparatus 100. For example, if the keyboard or the mouse is used to perform an input operation before the information processing apparatus 100 falls, it can be determined that the information processing apparatus 100 has fallen while being used by the user and that it has been unstably used on the user's lap or the like. On the other hand, if no input operations have been performed for a certain period before the image processing apparatus 100 falls, then it can be determined that the information processing apparatus 100 has fallen as a result of an operation of lifting the apparatus 100 with the user's hands. These results of status determinations can be used as a condition for causing the magnetic head 11 to escape as required. Furthermore, after the magnetic head 11 has escaped, if an input operation is performed on the basis of user interactions using the keyboard or the mouse, this can be used as a condition to return the magnetic head 11.

Further, by utilizing the presence or absence of an input operation, an operation density (the amount of inputs per unit time), and an input pattern for adjusting a reference (threshold Th) for a shock prediction, the escape conditions for the magnetic head 11 can be made further consistent with the user's use status at that time.

Specifically, when a predetermined input operation was performed within a past specified period, it can be assumed that a variation in acceleration detected at the present time did not occur inadvertently as a result of the fall of the information processing apparatus 100 but obviously occurred during operation and that even if the variation is a sign of a fall, the user can take action quickly to prevent the fall. Thus, when such an input operation is performed, it is possible to provide such control as increases the threshold Th above its normal value to reduce the sensitivity for a variation in the status of the information processing apparatus 100 to hinder a sensitive escape operation of the magnetic head 11 associated with a variation in acceleration during operation. Furthermore, by additionally using the operation density or the input pattern for adjusting the threshold Th, it is possible to inhibit the mere detection of an input operation from causing the threshold Th to be adjusted unless for example, a specified operation density or higher has been detected within a past specified period.

Further, to determine whether or not the user is intentionally operating the mouse, it is possible to selectively incorporate, into the adjustment of the threshold Th, evaluation as to whether or not the mouse cursor is following a monotonous straight track, the cursor is moving at a speed higher than the normal one, or a double click has been carried out. On instantaneously holding the information processing apparatus 100 in order to prevent its fall, the user may unintentionally touch the mouse to carry out a mouse input. The selective use of mouse inputs is effective in preventing such unintentional inputs from being mistaken for the user's intentional input operations performed during normal use. Likewise, for keyboard inputs, the presence of appropriate typing intervals in a series of inputs or the like can be used as a reference for determining whether or not an input operation has been intended by the user.

The above described modules other than the time-driven control section 63 can communicate with the shock prediction section 65. These modules provide determination information used to generate a request for the escape or return of the magnetic head 11 transmitted to the HDD filter driver 33 by the shock prediction section 65 as well as a notification indicating that the operation mode has been switched (this notification will be described later).

Figure 7:
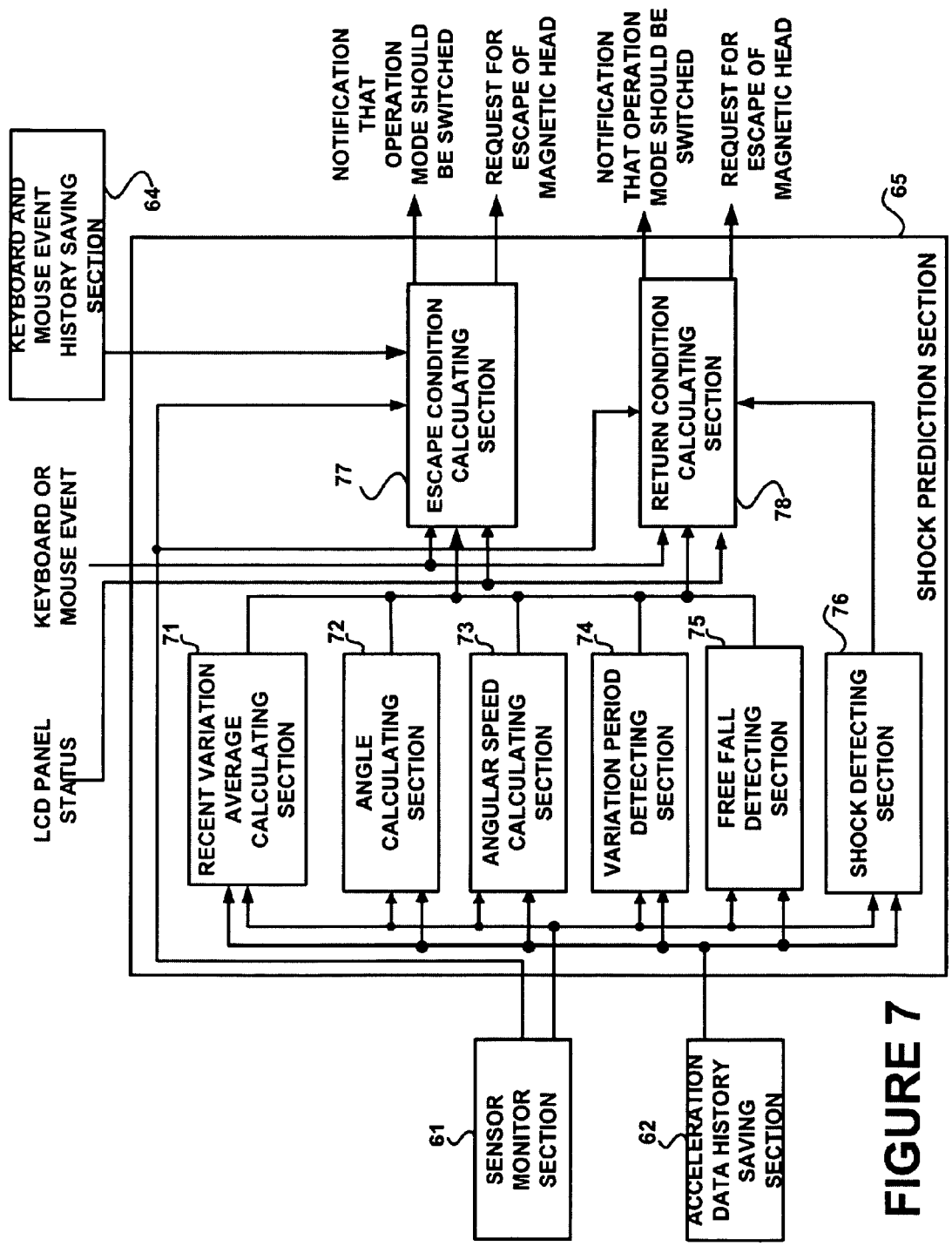
FIG. 7 is a view illustrating the internal functions of the shock prediction section shown in FIG. 6, in further detail.

FIG. 7 is a view illustrating the internal functions of the shock prediction section 65 in further detail.

Referring to FIG. 7, the shock prediction section 65 comprises a recent variation average calculating section 71, an angle calculating section 72, an angular speed calculating section 73, a variation period detecting section 74, a free fall detecting section 75, a shock detecting section 76, an escape condition calculating section 77, and a return condition calculating section 78.

The recent variation average calculating section 71 mainly uses the information from the acceleration data history saving section 62 to calculate the mean of accelerations (absolute values) acquired during the preceding predetermined period or the mean of integral values (speeds) of the accelerations. Alternatively, based on the mean of accelerations or speeds, a similar predetermined statistical amount may be calculated. The statistical amount may be a weighted average acquired by applying a weight to the present side of the time axis, an average acquired by excluding periods having as data values outside a predetermined range, the standard deviation of a variation during the period, or the like.

On the basis of this calculated value, it is determined whether the information processing apparatus 100 is stably used or is unstably used on the user's lap or while the user is up. This makes it possible to adaptively change sensitivity to a new acceleration, on which a shock prediction is based, between the stable status and the unstable status. That is, if the average of variations in acceleration or speed (that is, variations in the status of the information processing apparatus 100) falls within a specified range for a specified period, it can be determined that the information processing apparatus 100 is in the condition in which it is forced to undergo a certain degree of vibration when used, for example, it is on the user' lap or in a moving car. It can further be determined that this is not a sign of a fall. This enables the provision of such control as lowers the sensitivity on which a shock prediction is based.

Furthermore, the above calculated value can be utilized to adapt a reference for a condition for returning the magnetic head 11. That is, it is assumed that after a shock has been predicted to occur and then the magnetic head 11 has escaped, no excessive shocks are actually detected and it is then determined that the magnetic disk device is stable (a stationary status or a similar status involving position changes within a specified range has lasted for a specified period). Then, the HDD filter driver 33 is requested to return the magnetic head 11 and then actually returns it. In this case, the determination reference (return condition) is adaptively adjusted on the basis of the status preceding the prediction of occurrence of a shock, i.e. on the basis of the history of variations in inclination or dynamic acceleration during a specified period which variations are acquired from outputs from the sensor 20. For example, if the variation is relatively large for the specified period before the escape of the magnetic head 11, it is expected that the information processing apparatus 100 has been used in an environment that intrinsically causes such a variation in position (on the user's lap or the like). Accordingly, adjustment is made so that the magnetic head 11 is returned under a relatively loose return condition (even with a small variation in position).

The angle calculating section 72 tracks the inclinatory displacement of the information processing apparatus 100. Specifically, a predetermined static gravity acceleration in a horizontal condition is used as a reference. This reference value is compared with the current gravity acceleration to determine the current inclination. If this inclination is a specified angle or larger, then in most cases, such an angle does not occur while the information processing apparatus 100 is being used but, for example, immediately after it has started to fall (immediately after a shift to the second stage shown in FIG. 4). Thus, if such an angular displacement has occurred, then it is determined that a shock will occur on the basis of a combination of this angular displacement with the result of calculation by the angular speed calculating section 73, described later. The acceleration value acquired by the sensor 20 is often the synthesis of a dynamic acceleration and a static acceleration. Accordingly, it is necessary to use a low pass filter or the like to exclude variations falling outside a low frequency range on a frequency axis to extract a static acceleration.

The angular speed calculating section 73 is utilized to predict a shock by combining a value acquired by the angular speed calculating section 73 with the angular displacement calculated by the angle calculating section 72 as described above. That is, a shock is predicted to occur if the information processing apparatus 100 is not only inclined through a specified angle or larger but this angular displacement also occurs at a predetermined angular speed. In this regard, a shock is predicted to occur even if the angular displacement does not occur at the predetermined angular speed. An allowable limit on the angular speed may be adaptively set according to this angle so that control can be provided such that a shock is determined to occur if a relatively high angular speed is detected in spite of a small inclination (angular displacement).

One method of simply determining an angular speed using a linear accelerometer sequentially calculates angular displacement values every unit time, the angular displacement values being obtained from the linear accelerometer, and alternatively uses the value obtained as an average angular speed.

The variation period detecting section 74 monitors the variation pattern of a particular acceleration or a numerical value (for example, a speed) calculated on the basis of the acceleration. Consequently, even with a variation in acceleration the level of which is insufficient to predict a shock to occur, a shock can be predicted to occur if this variation in acceleration has a particular pattern. Specific examples of detected patterns include an acceleration variation pattern detected if the user is operating the information processing apparatus 100 while walking and a characteristic acceleration variation pattern detected if the information processing apparatus 100 slips down from the user's lap without any extreme rotational motion.

If the gravity acceleration varies rapidly and discontinuously, the free fall detecting section 75 detects this to determine that the information processing apparatus 100 has started a free fall. If it is determined that the information processing apparatus 100 has started a free fall, then on the basis of this determination, a shock is determined to occur.

On the basis of the acceleration data, the shock detecting section 76 determines that the information processing apparatus 100 has actually fallen and has been excessively shocked. Then, the shock detecting section 76 provides the return condition calculating section 78 with information required to determine whether to make determination for the return condition after the actual shock or to promptly return the magnetic head 11 because the escape condition calculating section 77 has mistakenly determined that the magnetic head 11 escape.

The escape condition calculating section 77 receives the information calculated by the above described modules other than the shock detecting section 76 and makes a total determination to determine whether the information processing apparatus 100 is unstable (first stage in FIG. 4) or the magnetic head 11 must escape immediately after a fall has started (second stage in FIG. 4). In the latter case, the escape condition calculating section 77 requests the HDD filter driver 33 to cause the magnetic head 11 to escape. On the other hand, in the former case, the escape condition calculating section 77 notifies the IDE device driver 37 that the operation mode should be switched to a high risk mode as described later.

After the magnetic head 11 has escaped in response to the notification from the escape condition calculating section 77, the return condition calculating section 78 receives the information calculated by the above described module including the shock detecting section 76 and make a total determination to determine whether or not to return the magnetic head 11. To return the magnetic head 11, the HDD filter driver 33 is requested to return the magnetic head 11. Further, on the basis of the determination result, the IDE device driver 37 is notified that the operation mode should be switched to a normal mode, described later.

FIG. 8 is a view showing an example of an operation algorithm used by the escape condition calculating section 77.

In this case, the escape condition for the magnetic head 11 is only the angular speed occurring in the information processing apparatus 100. The angular speed detected by the sensor 20 (that is, the angular speed occurring in the information processing apparatus 100) at a predetermined time is defined as ω. A threshold used to determine whether or not to request that the magnetic head 11 escape is defined as Th. An integral value for accelerations accumulated during a history accumulation period is defined as v. A proportionality factor changed according to the current inclination (angular displacement) A is defined as $k_n$. An allowable small variation is defined as b. Then, the threshold Th is calculated, for example, using:

$$Th = k_n \cdot v + b$$

(where $k_n=2$ ($|A|<\pi/6$), $k_n=1$ ($|A|>\pi/6$)

Referring to FIG. 8, the escape condition calculating section 77 predicts that a fall starts (second stage in FIG. 4) to cause a shock if the angular speed ω is larger than the threshold Th. The escape condition calculating section 77 then requests the HDD filter driver 33 to cause the magnetic head 11 to escape. Then, the escape condition calculating section 77 avoids allowing the magnetic head 11 to return before a shock occurs or while a shock remains likely to occur. It thus starts an escape timer to ensure that the magnetic head 11 remains escaping for a specified period (this is accomplished using an appropriate arbitrary mechanism such as the counting of the system timer).

On the other hand, if the angular speed ω is higher than the half of the threshold Th, the escape condition calculating section 77 determines that the information processing apparatus 100 is unstable (first stage in FIG. 4). The escape condition calculating section 77 notifies the IDE device driver 37 of a transition to the high risk mode, described later. It then starts a high risk mode timer in order to maintain a high-risk-mode operational status for a specified period.

FIG. 9 is a view showing an example of an operation algorithm used by the return condition calculating section 78.

Referring to FIG. 9, if the angular speed ω is lower than the quarter of the threshold Th after the escape timer has timed out (a preset time has elapsed), then the return condition calculating section 78 determines that no shocks will occur. The return condition calculating section 78 requests the HDD filter driver 33 to cause the magnetic head 11 to return.

On the other hand, if the angular speed ω is lower than one-eighth of the threshold Th after the high risk mode timer has timed out, then the return condition calculating section 78 determines that the information processing apparatus 100 is stable. The return condition calculating section 78 requests the IDE device driver 37 to shift to a normal risk mode, described later.

In the above operation algorithm, the values such as the half and quarter of the threshold Th are only examples. Other appropriate values may be used. Further, these values may be adaptively varied depending on the result of a calculation executed by the recent variation average calculating section 71 or the variation period detecting section 74. Furthermore, of course, an actual shock prediction uses not only the threshold Th for the angular speed ω but also a threshold for the result of a total determination for the information calculated by the modules starting with the recent variation average calculating section 71 and ending with the free fall detecting section 75.

Further, the above described configuration of the shock manager 32 and its operation algorithm simply illustrate preferred examples of the present embodiment. It is needless to say that various embodiments can be accomplished depending on the type of the sensor 20 or the like as long as the shock manager 32 determines the status of the information processing apparatus 100 on the basis of outputs from the sensor 20, controls the escape and return of the magnetic head 11, or controls the switching between the operation modes.

The HDD filter driver 33 is provided between the HDD driver 36 and the IDE device driver 37 to issue an unload command for the escape of the magnetic head 11 and a load command for the return of the magnetic head 11 on the basis of corresponding instructions from the shock manager 32 (requests for the escape and return of the magnetic head 11). Further, the HDD filter driver 33 controls the access of the HDD driver 36 and IDE device driver 37 to the magnetic disk device 10 to get ready to allow the magnetic head 11 to escape quickly when the information processing apparatus 100 falls. Specifically, the HDD filter driver 33 sets two methods of accesses to the magnetic disk device 10: a normal mode used if the information processing apparatus 100 is stable and a high risk mode used if the information processing apparatus 100 is likely to be excessively shocked owing to its fall. Then, the HDD filter driver 33 switches the operation mode according to the determination result of the status of the information processing apparatus 100.

In the normal mode, the HDD filter driver 33 acts simply as the interface between the HDD driver 36 and the IDE device driver 37 and performs no special operations. On the other hand, in the high risk mode, the HDD filter driver 33 adds the following two operations to the access to the magnetic disk device 10 based on the control of the file system 35: (1) the division of an access unit and (2) the disabling of a write cache function. These added operations, when the host computer 30 issues an unload command, this unload command can be immediately executed to allow the magnetic head 11 of the magnetic disk device 10 to escape from the magnetic disk 12.

Description will be Given below of Operations of the HDD Filter Driver 33 in the High Risk Mode.

(1) Division of the Access Unit

In the magnetic disk device 10, a single data file recorded in the magnetic disk 12 is composed of a plurality of consecutive blocks (data blocks) of a variable size equal to an integral multiple of size of a sector, a recording unit of the magnetic disk 12 or an integral multiple of size of a cluster, the minimum recording unit of a file system.

As described above, the common magnetic disk device 10 cannot respond to the host computer 30 while executing a data write or other process. Thus, even when the shock manger 32 detects the start of fall of the information processing apparatus 100 and the host computer 30 then transmits an unload command to the magnetic disk device 10, it is impossible to execute the unload command for the escape of the magnetic head 11 until the above process is completed. Consequently, if a data file to be accessed contains a large data block (spanning a large number of sectors or clusters), the unload command may have to wait for a long time before being executed. Further, when the magnetic disk 12 is formatted, the control of the magnetic disk device 10 may be occupied by this formatting operation for a long time.

To avoid such a situation, the HDD filter driver 33 performs the operation described below. In the high risk mode, if a data block to be accessed in response to a request issued by the file system 35 is relatively large and it is thus expected to take a long time to access the data block, then the HDD filter driver 33 divides the data block (large block) into smaller blocks of a specified size or smaller. The HDD filter driver 33 thus divides an access request for the data block into access requests for the individual smaller blocks before accessing the magnetic disk device 10. By setting the size of the smaller block, for example, to correspond to the unit of the sector or cluster, it is possible to minimize the time required to access the individual smaller blocks. The access request issued by the file system 35 contains a transfer data size, a write destination, and the like. Accordingly, on the basis of the contents of the request, the size of the data block can be recognized to determine whether or not the access requires a long time. This serves to reduce the data size corresponding to a single access.

As a result, the control of the magnetic disk device 10 is occupied by the access operation only for a specified time or shorter.

Figure 10:
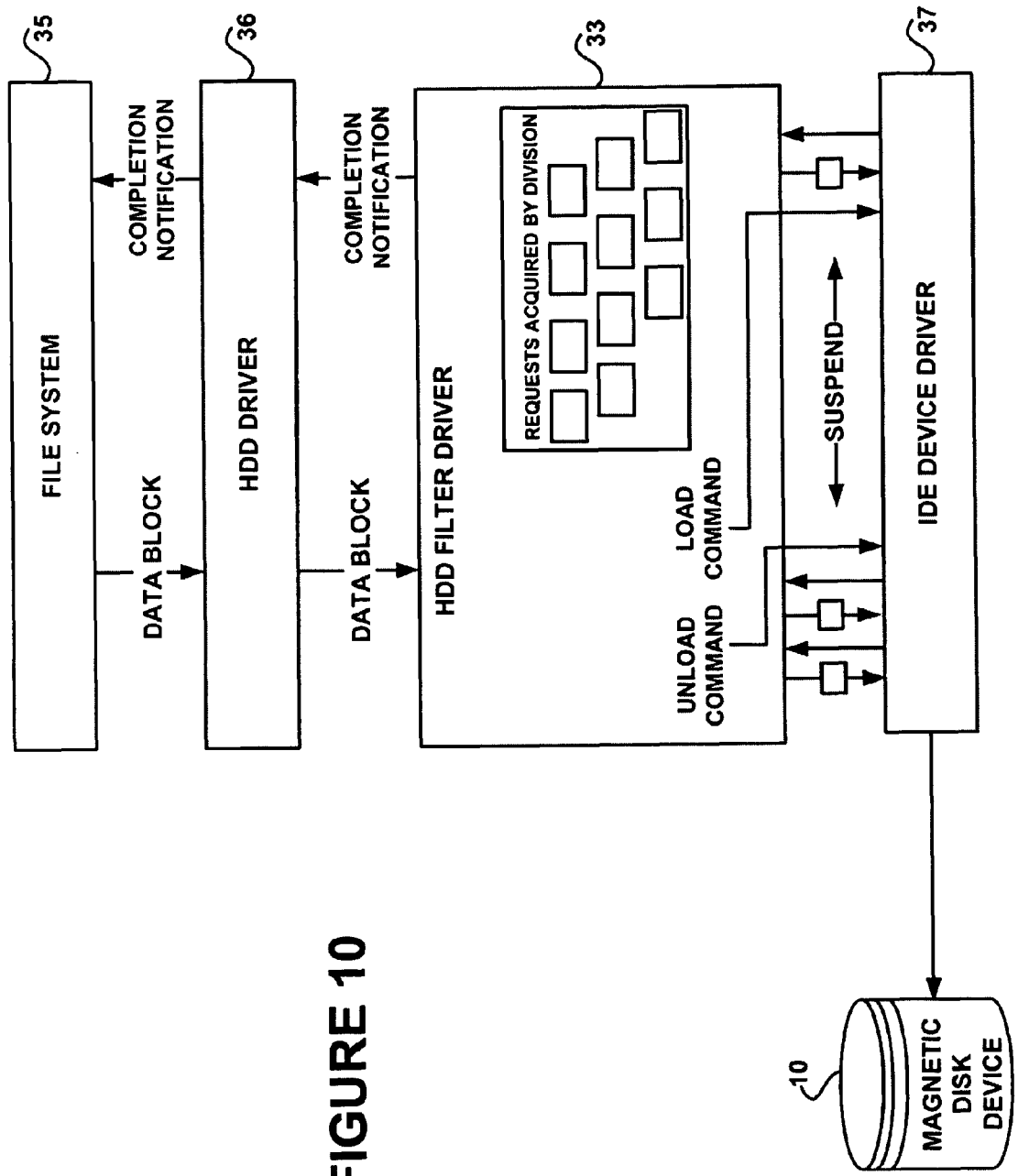
FIG. 10 is a view illustrating the concept of division of an access unit according to the present invention.

FIG. 10 is a view illustrating the concept of division of the access unit.

In this case, as shown in FIG. 10, once all smaller blocks obtained by the division have been accessed, the HDD filter driver 33 considers that the undivided large block has been completely accessed, and notifies the file system 35 of this. Thus, the dividing operation is hidden from the file system 35.

On the other hand, if an unload command is issued while the large block is being accessed, it is executed once the smaller block being accessed at that time is completely accessed. This prevents a longer time from elapsing after an unload command has been issued and before it is executed.

Further, if the magnetic head 11 is unloaded while the large block is being accessed, unprocessed smaller blocks are accumulated and saved in an internal queue in the HDD filter driver 33. Then, after the magnetic head 11 has been loaded, data transfer requests for the smaller blocks saved and waiting in the internal queue are ejected in a FIFO form. Thus, the suspended process is executed again.

(2) Disabling of the Write Cache Function

As described above, in order to improve the speed of responses to the host computer 30, the magnetic disk device 10 comprises a cache memory to perform a write cache operation in writing data. To perform an unloading operation to cause the magnetic head 11 to escape from the magnetic disk 12, the cache is flushed so that the magnetic data (nonvolatile data) on the magnetic disk 12 reflects the volatile data in the cache memory before the unloading operation is performed. Thus, even when the shock manager 32 detects the start of fall of the information processing apparatus 100 and the host computer 30 then transmits an unload command to the magnetic disk device 10, a long time may elapse after the cache has been flushed and before the unload command is executed.

To avoid this situation, the HDD filter driver 33 disables the write cache function of the magnetic disk device 10 in the high risk mode. Thus, when an unload command is issued, it can be immediately executed without flushing the cache to cause the magnetic head 11 to escape from the magnetic disk 12.

If the shock manager 32 determines that the information processing apparatus 100 is stable and the HDD filter driver 33 switches its operation to the normal mode, then the write cache function of the magnetic disk device 10 is enabled again.

As a variation of the above described disabling of the write cache function, a method can be employed which comprises flushing the cache whenever dirty data is generated in the cache memory, to create the same condition in which the write cache function is substantially enabled (the condition in which no dirty data is accumulated in the write cache).

When the write cache function is completely disabled, the magnetic head 11 can be promptly unloaded. However, for a normal access process, it becomes impossible to take advantage of an increase in the speed of responses to the host computer 30 based on the write cache. Consequently, the performance is slightly degraded.

Thus, with this method, the HDD filter driver 33 does not disable the write cache function in the high risk mode. Instead, every time data is written to the magnetic disk 12, a cache flush command is immediately transmitted to the magnetic disk device 10 to delete dirty data generated in the cache memory owing to this data write. Thus, the cache memory can be utilized for data write operations to improve the speed of responses to the host computer 30. On the other hand, no dirty data is accumulated in the cache memory except when a data write is executed. This is substantially equal to the condition in which the write cache function is disabled.

This means that accesses to the magnetic disk device 10 do not always require a continuous long time, so that by inserting a cache flushing operation into an idle period of the magnetic disk device 10 between access operations, the cache memory is substantially prevented from being populated by dirty data in the cases where the magnetic head 11 is asynchronously subject to unloading. That is, this method produces effects similar to those of substantial disabling of the write cache function.

As described above, if the information processing apparatus 100 is unstable and is likely to be shocked because of its fall, the HDD filter driver 33 is switched to the high risk mode to control the IDE device driver 37. For accesses to the magnetic disk device 10, the HDD filter driver 33 performs the following operations: (1) the division of the access unit and (2) the disabling of the write cache function (including the substantial disabling of the write cache function by the immediate flushing of the cache memory). Thus, immediately after the shock manager 32 has predicted a shock, the magnetic disk head 11 is unloaded. Consequently, even if the apparatus falls by only a short distance (only a short time elapses after a fall has started and before a shock occurs), the magnetic head 11 can be caused to sufficiently escape from the magnetic disk 12.

These two additional operations are not dependent on each other but independently reduce the time elapsing before the magnetic head 11 is unloaded. Accordingly, only one of them may be performed.

Once the shock manager determines that the information processing apparatus 100 is likely to be excessively shocked and the magnetic head 11 is then unloaded, even if the file system 35 transmits a new request for an access to the magnetic disk device 10, the HDD filter driver 33 only receives this access request and does not allow the access to be executed until such a high risk status is cleared. The high risk status is cleared if a shock prediction is found incorrect and it is determined that the housing of the information processing apparatus 100 is no longer subjected to changes, which have brought about the prediction, and is now stable or if a shock occurs as predicted and it is then determined that the information processing apparatus 100 has been stable for a period sufficient to determine that the shock has disappeared (the period empirically considered to be sufficient), as described above in the operations of the escape condition calculating section 77 and the return condition calculating section 78. The file system 35 cannot start the succeeding process before the access request is completed. That is, before the information processing apparatus 100 satisfies the condition for returning the magnetic head 11, the magnetic head 11 is not loaded in spite of a new access request issued by the file system 35.

Figure 11:
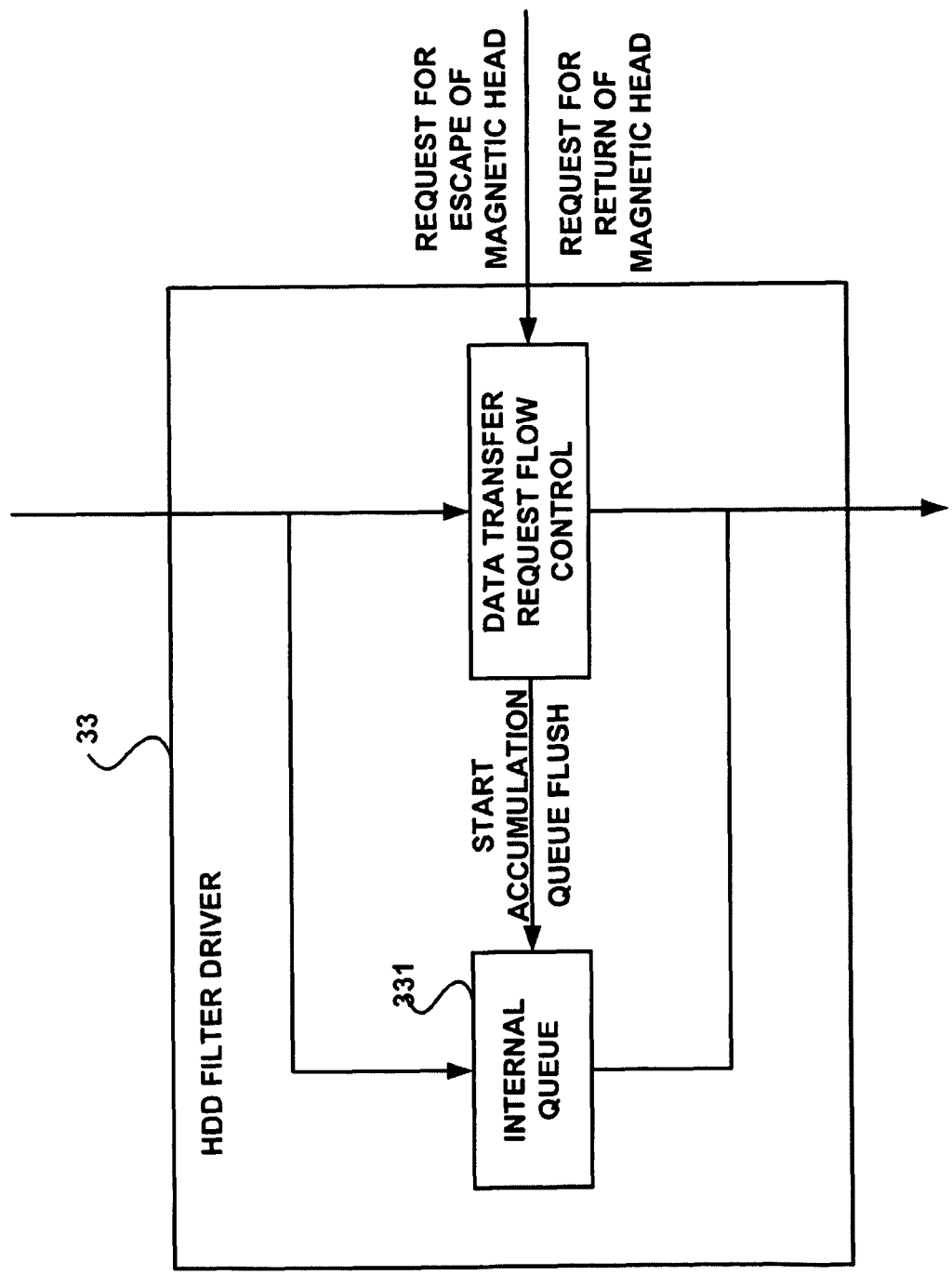
FIG. 11 is a view illustrating operations performed if an HDD filter driver according to the present invention receives an access request while causing a magnetic head to escape.

FIG. 11 is a view illustrating operations of the HDD filter driver 33 in this case.

It is assumed that the file system 35 delivers a data transfer request (access request) to the HDD filter driver 33 before either of the following conditions is met: the magnetic head 11 has already escaped and the information processing apparatus 100 has remained stationary for a specified period or a similar status involving position changes within a specified range has lasted for the specified period (that is, the information position has been stable), or an input based on a user interaction has been executed using the mouse or keyboard in order to load the magnetic head 11. In this case, this data transfer request is accumulated in an internal queue (data transfer request accumulation queue) 331 in the HDD filter driver 33. Then, the condition for returning the magnetic head 11 in the information processing apparatus 100 is met, and the shock manager 32 transmits a request for the return of the magnet head 11. Upon receiving this request, the HDD filter driver 33 first ejects data transfer requests already accumulated in the internal queue 331 in a FIFO form (a queue flash command). The HDD filter driver 33 then processes the newly arriving data transfer request. In this regard, data transfer requests arriving while the internal queue 331 is being flushed are sequentially accumulated in the internal queue 331 in spite of the flushing operation. This transition status is thus dealt with. After all data transfer requests accumulated in the internal queue 331 have been ejected, the process returns to normal flow control for data transfer requests.

The above operations serve to avoid the following situation: while the magnetic head 11 is being unloaded, it inadvertently returns to its preceding position. The subsequent external shock causes the magnetic head 11 and the magnetic disk 12 to collide against each other to damage the magnetic disk 12. As a result, part or all of the data cannot be restored.

If the access unit is divided and if the magnetic head 11 is unloaded before all access requests obtained by the division have not been processed, then the transmission of the unprocessed access requests to the IDE device driver 37 remains suspended until the escaping magnetic head 11 returns. Consequently, also in this case, the magnetic head 11 is prevented from returning to its preceding position to damage the magnetic disk 12.

Once the return condition for the magnetic head 11 is met, the HDD filter driver 33 transmits an operation request to the IDE device driver 37, the request being required to load and return the magnetic head 11 to the magnetic disk 12 (a load command). However, this operation request is not required if the magnetic disk device 10 can automatically load the magnetic head 11 by transmitting a normal data processing request. However, if the time required to recover the magnetic head 11 is to be reduced or omitted before the next access to the data in the magnetic disk device 10, a recovery operation request (load command) may be transmitted once the recovery conditions for the magnetic head 11 are met, regardless of the presence of a data access even if the magnetic head 11 is adapted to be automatically recovered in association with data accesses.

In the above embodiment, the HDD driver 36, the HDD filter driver 33, and the IDE device driver 37 are separate modules. A single module can be constructed and implemented which includes the functions of these drivers.

Further, in the present embodiment, the unload command is used to cause the magnetic head 11 to escape from the magnetic disk 12. However, for the magnetic disk device 10 that does not include an exclusive command for unloading of the magnetic head 11, a power saving command (a standby command or the like) can be used which stops a spindle motor that rotationally drives the magnetic disk 12, or the like.

Even the above present embodiment cannot perfectly prevent the magnetic disk device 10 from failing and malfunctioning if the magnetic head 11 cannot escape in time when the information processing apparatus 100 is shocked. In the present embodiment, the inclination or vibration of the information processing apparatus 100 is analyzed to have the magnetic head 11 escape after the status of the information processing apparatus 100 has shifted from a first stage to a second stage in FIG. 4. Thus, if the time after a shift to the second stage and before the occurrence of a shock is extremely short, e.g. if the user attempts to lift the information processing apparatus 100 being used on a desk (in a stationary state) and then inadvertently drops it, a shock may occur before an escape operation of the magnetic head 11 according to the present embodiment is completed. Consequently, the magnetic disk 12 may be damaged.

If a shock to the magnetic disk device 10 results in permanently defective parts (flaws) in a magnetic recording area of the magnetic disk 12, then recorded data is directly lost from this area. Furthermore, if the magnetic head 11 collides against the surface of the magnetic disk 12 to scrape the coated magnetic surface of the disk 12 and resultant fine fragments of the surface scatter inside the magnetic disk device 10, then a secondary fault may occur in which the fragments may be placed between the magnetic head 11 and the magnetic disk 12, which are (appear to be) operating correctly, to cause larger flaws in the magnetic disk 12.

If the user can accurately determine that such defects, i.e. defective parts resulting from physical flaws are occurring in the magnetic recording area of the magnetic disk 12, the user will desire to know how much they affect the system even if he or she must suspend the operation being performed at that time in order to do so. Further, to minimize possible damage in the near future, it is preferable to perform immediately a recovery operation such as data backup.

Thus, as another embodiment of the present invention, the inventors propose a means for examining whether or not the magnetic head 11 completely escaped after the prediction of a shock to the magnetic disk device 10 and before the occurrence of an actual shock, to check whether or not the shock has damaged the magnetic disk 12, and for notifying the user of the necessity of action such as backup.

In the protection mechanism of the magnetic disk device 10 according to the present embodiment, the shock manager 32 of the protection mechanism shown in FIG. 5 is additionally provided with a function of comparing the time from the start until completion of an escape operation of the magnetic head 11 with the time from the start of the escape operation until the occurrence of a shock to determine whether or not the magnetic head 11 has escaped in time.

Figure 12:
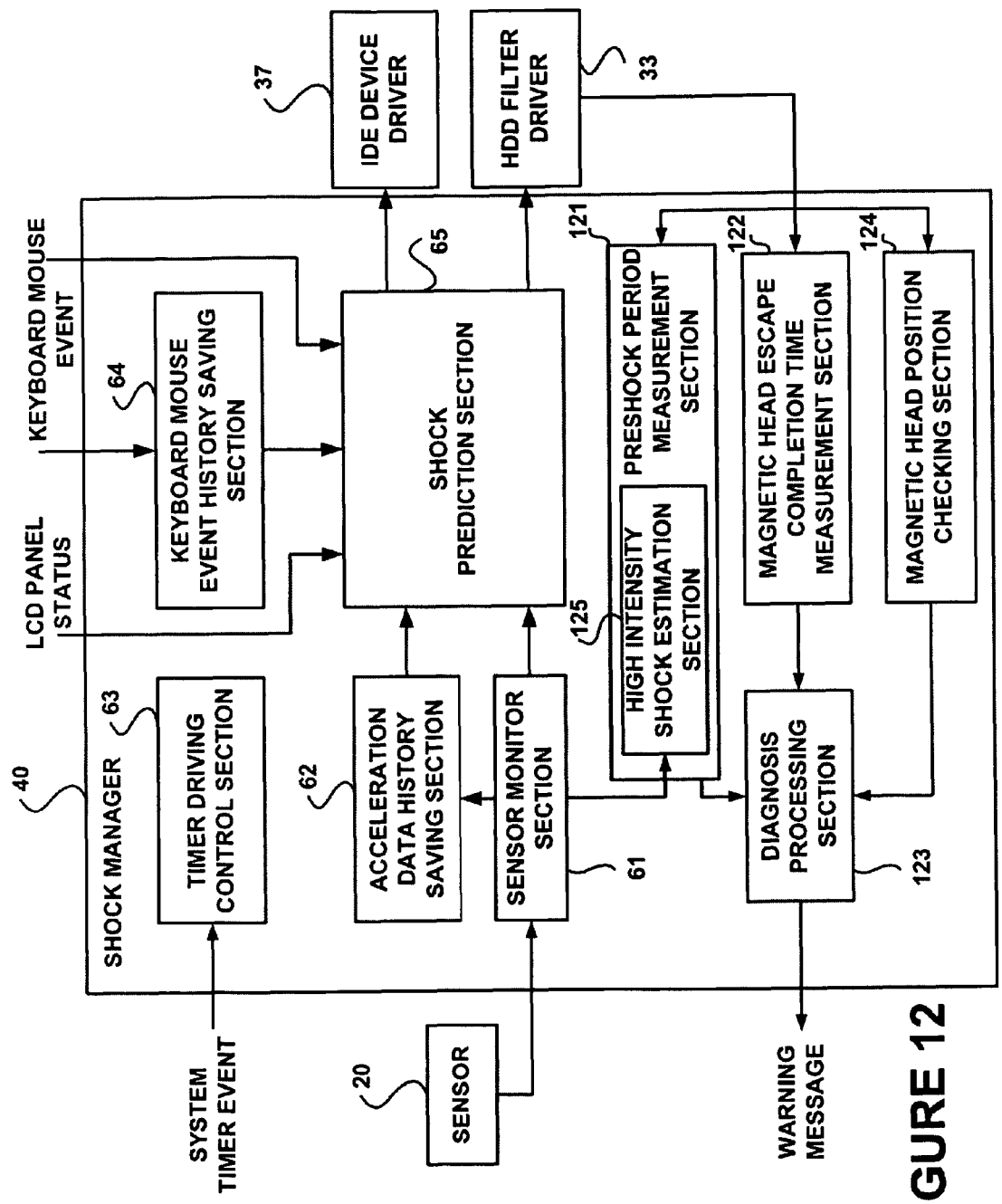
FIG. 12 is a view showing a functional configuration of a shock manager according to another embodiment of the present invention.

FIG. 12 is a view showing a functional configuration of the shock manager 40 according to the present embodiment.

As shown in FIG. 12, the shock manager 40 comprises a sensor monitor section 61, an acceleration data history saving section 62, a time-driven control section 63, a keyboard mouse event history saving section 64, and a shock prediction section 65 all of which constitute the shock manager 32, shown in FIG. 6, and a pre-shock time measurement section 121, a magnetic head escape completion time measuring section 122, a diagnosis processing section 123, and a magnetic head position checking section 124 as a means for carrying out diagnosis as to whether or not the magnetic head 11 has escaped before the occurrence of a shock.

If the magnetic head 11 has performed an escape operation, the pre-shock period measurement section 121 measures the time (pre-shock period) from the start of the escape operation until the occurrence of an actual shock. As shown in FIG. 12, the pre-shock period measurement section 121 receives an inputted notification of the start of an escape operation of the magnetic head 11 from the HDD filter driver 33 and records the time of this input. Further, the pre-shock period measurement section 121 receives acceleration data from the sensor monitor section 61 and records the time of the occurrence of the shock.

As shown in the figure, the pre-shock period measurement section 121 comprises a high intensity shock estimation section 125 that analyzes acceleration data inputted by the sensor monitor section 61 to detect the occurrence of a shock. Specifically, if a fall of the information processing apparatus or the like causes an intense shock (high intensity shock) exceeding the measurable range of the sensor 20, the high intensity shock assumption section 125 determines a characteristic shock amplitude pattern detected by the sensor 20, to identify this high intensity shock. Then, the time at which the occurrence of the high intensity shock was detected is obtained.

The pre-shock period measurement section 121 calculates a pre-shock time on the basis of the time at which the magnetic head 11 started an escape operation of the magnetic head 11 and which is determined on the basis of the notification from the HDD filter driver 33 and the time at which the high intensity shock estimation section 125 detected the high intensity shock. The pre-shock period measurement section 121 then transmits the calculated pre-shock time to the diagnosis processing section 123.

If the magnetic head 11 has performed an escape operation, the magnetic head escape completion time measurement section 122 measures the time required to complete this escape operation. As shown in FIG. 12, the magnetic head escape completion time measurement section 122 receives inputted notifications of the start and completion of the escape operation of the magnetic head 11 from the HDD filter driver 33 to calculate the time required for the escape operation, on the basis of the time of this input. In this connection, to reduce loads on the shock manager 40 and the filter driver 33, it is possible to perform the operation described below instead of measuring the time actually required for each escape of the magnetic head 11. An escape operation is actually performed before a boot or when the magnetic disk device 10 is detected. Then, the time required for the operation is measured and saved to a cache memory. Subsequently, the saved value is utilized as the time required to complete an escape operation when a shock is predicted. Furthermore, a characteristic value evaluated on the basis of the specification of the magnetic disk device 10 or the like may be retained in a memory such as ROM so as to be utilized as the time required to complete an escape operation when a shock is predicted.

The magnetic head escape completion time measurement section 122 transmits the escape time of the magnetic head 11 for a predicted shock obtained as described above, to the diagnosis processing section 123.

On the basis of the pre-shock period received from the pre-shock period measurement section 121 and the escape time of the magnetic head 11 for a predicted shock received from the magnetic head escape completion time measurement section 122, the diagnosis processing section 123 determines whether or not the escape operation of the magnetic head 11 was successfully performed before a shock occurred actually. If the diagnosis processing section 123 determines that the escape operation was not in time, it notifies the user that the magnetic head 11 may collide against and damage the magnetic disk 12, by outputting a corresponding warning message as a diagnosis result.

Figure 13:
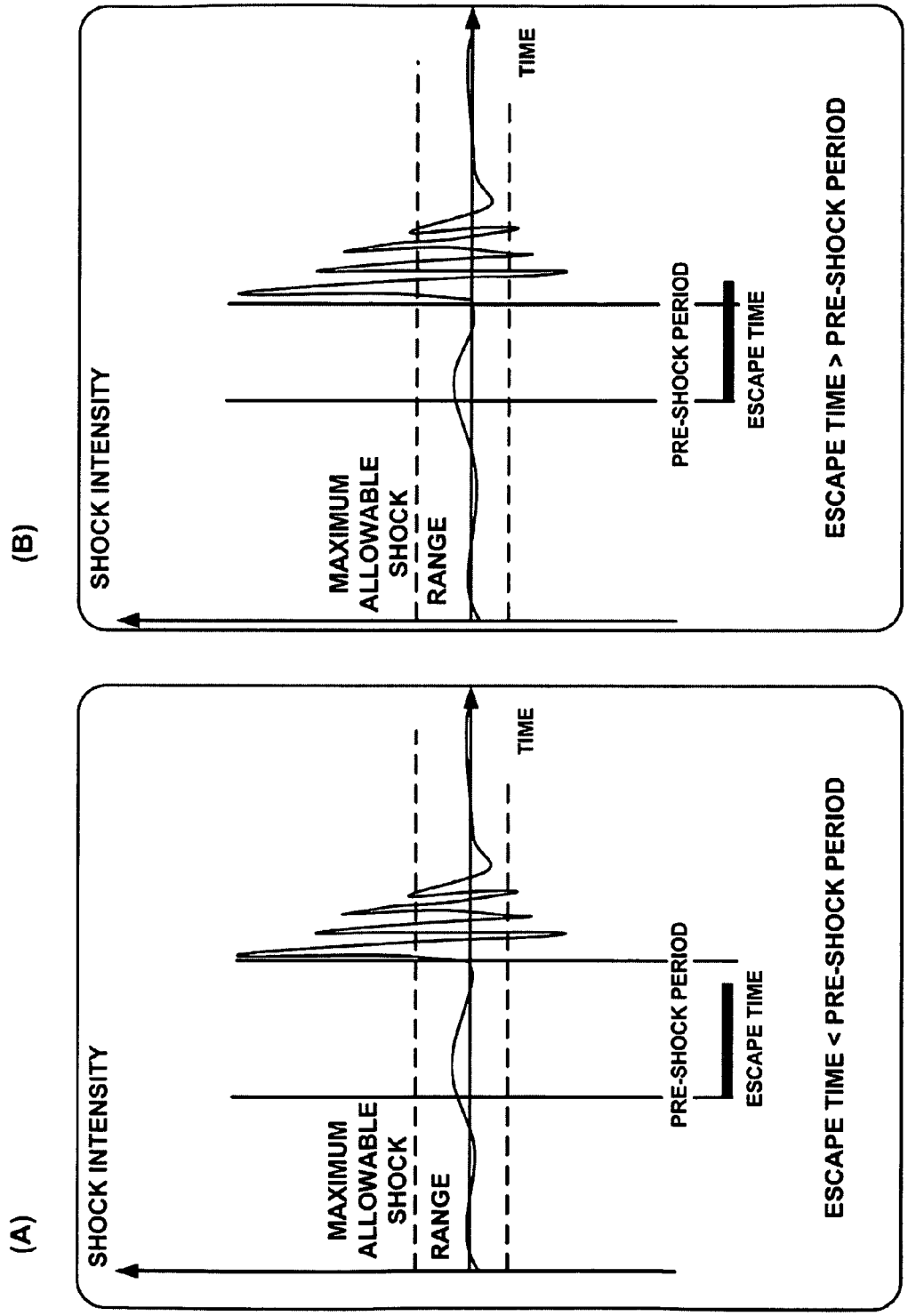
FIG. 13 is a graph illustrating the relationship between a pre-shock period and an escape time for a magnetic head which relationship is used by a diagnosis processing section for determinations.

FIG. 13 is a graph illustrating the relationship between the pre-shock period and the escape time of the magnetic head 11 which relationship is used by the diagnosis processing section 123 for determinations.

In the present embodiment, as shown in FIG. 4, a process from the start of oscillation of the information processing apparatus 100 until the occurrence of a shock due to falling is classified into four stages. Then, the magnetic head 11 is requested to escape when the shock prediction section 65 determines that the status of the information processing apparatus 100 has shifted from a first stage to a second stage.

Accordingly, as shown in each graph in FIG. 13, a certain time elapses from the time at which the magnetic head 11 is requested to escape until an actual shock (having an intensity exceeding the tolerable limit (maximum allowable shock range) of the magnetic disk device 10) occurs. This is the pre-shock period measured by the pre-shock period measurement section 121. The diagnosis processing section 123 checks whether or not the magnetic head 11 has completed an escape operation during the pre-shock period.

As shown FIG. 13(A), if the escape time of the magnetic head 11 is shorter than the pre-shock period, it is determined that the magnetic head 11 has completely escaped before the occurrence of a shock. Thus, diagnosis result is obtained which indicates that there are not any defective areas in the magnetic recording area of the magnetic disk 12. On the other hand, as shown in FIG. 13(B), if the escape time of the magnetic head 11 is longer than the pre-shock period, it is determined that the shock occurred before the magnetic head 11 escaped completely. Thus, diagnosis result is obtained which indicates that the magnetic recording area of the magnetic disk 12 contains defective areas.

The diagnosis result may be provided to the user only if the magnetic head 11 has failed to escape before the occurrence of a shock or the user may also be notified that it is unlikely that there will be a defective area even if the magnetic head 11 has completely escaped before the occurrence of the shock. Further, a warning message outputted as the diagnosis result may contain specific contents, i.e. may prompt the user to take action immediately by carrying out data backup or the like.

In this embodiment, the pre-shock period measurement section 121 calculates the pre-shock period on the basis of the time at which the magnetic head 11 started an escape operation and the time at which a shock occurred. Further, the magnetic head escape completion time measurement section 122 acquires the escape time of the magnetic head 11 for a predicted shock to compare it with the pre-shock period. However, other implementations are possible. For example, the high intensity shock estimation section 125 may input the time at which a high intensity shock was detected, directly to the diagnosis processing section 123. Further, the magnetic head escape completion time measurement section 122 may input, to the diagnosis processing section 123, an escape completion time calculated on the basis of the time at which the magnetic head 11 started an escape operation and the previously measured escape time. Then, on the basis of the order of these times, it may be determined whether or not the magnetic head 11 completely escaped before the occurrence of the shock.

The magnetic head position checking section 124 checks whether the magnetic head 11 is located over the magnetic disk 12 or away from the position over the magnetic disk 12 and at an escape position when the shock prediction section 65 requests the HDD filter driver 33 to cause the magnetic head 11 to escape. That is, the magnetic head 11 may be unloaded regardless of a shock prediction owing to a power saving function or the like. If the magnetic head 11 has already been unloaded when the shock prediction section 65 transmits a request for an escape of the magnetic head 11, then the diagnosis processing section 123 need not subsequently carry out diagnosis. Accordingly, the position of the magnetic head 11 (loaded or unloaded) at this time is verified.

In this case, when an escape request transmitted by the shock prediction section 65 causes the HDD filter driver 33 to issue an unload command and the magnetic head 11 then escapes, the controller for the magnetic disk device 10 returns a notification indicating that the escape has been completed. Accordingly, if the magnetic head 11 has already been unloaded before an escape operation is started, a notification of the completion of this operation is returned in a time extremely shorter than that required for a normal escape operation (about several dozen to hundred µsec (microseconds); for the normal escape operation: several 100 msec). Thus, if an operation completion notification is returned within a specified time (about 100 µsec) after the HDD filter driver 33 has issued an unload command, then the notification is transmitted from the HDD filter driver 33 to the magnetic head position checking section 124. Then, on the basis of this notification, the magnetic head position checking section 124 controls the diagnosis processing section 123 to end the diagnosis process.

Figure 14:
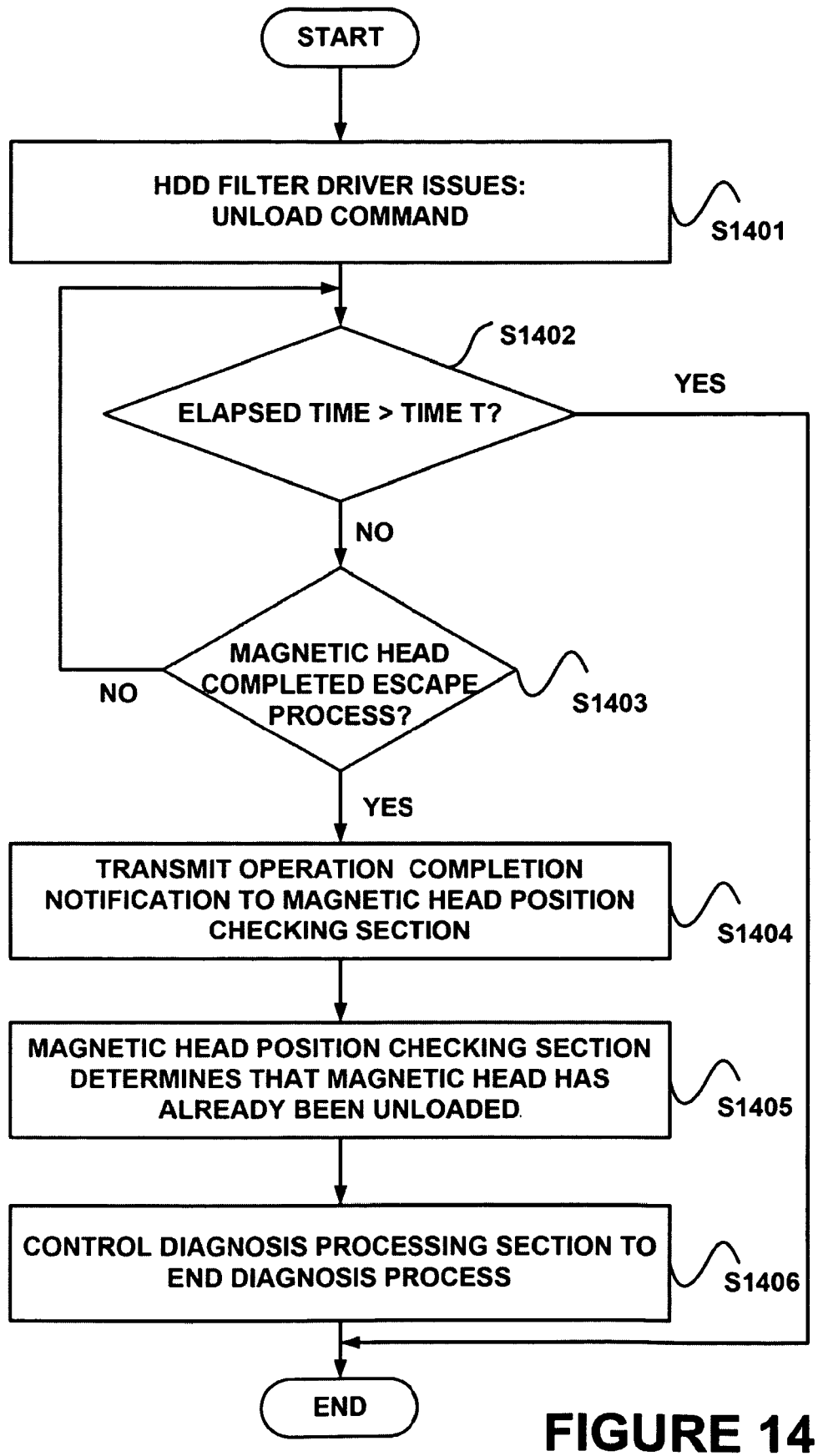
FIG. 14 is a flow chart illustrating a method executed by the HDD filter driver and a magnetic head position checking section to check the position of the magnetic head.

FIG. 14 is a flow chart illustrating a method executed by the HDD filter driver 33 and the magnetic head position checking section 124 to check the position of the magnetic head 11.

First, the HDD filter driver 33 issues an unload command in response to an escape request from the shock prediction section 65 (step 1401). The HDD filter driver 33 measures the time elapsing from the time of the issuance (step 1402). Then, if an escape process for the magnetic head 11 has been completed before the elapsed time exceeds a preset time T (for example, 100 µsec), then the HDD filter driver 33 transmits a corresponding operation completion notification to the magnetic head position checking section 124 (step 1404). On receiving the notification, the magnetic head position checking section 124 determines that the magnetic head 11 has already been unloaded (step 1405). The magnetic head position checking section 124 has the diagnosis processing section 123 end the diagnosis process (step 1406).

On the other hand, if the elapsed time has exceeded the preset time T before the escape process for the magnetic head 11 is completed (steps 1402 and 1403), the operation completion notification is not transmitted from the HDD filter driver 33 to the magnetic head position checking section 124. Accordingly, the magnetic head position checking section 124 does not determine that the magnetic head 11 has been unloaded. Consequently, the diagnosis processing section 123 continues the diagnosis process.

Now, description will be given of the general flow of a diagnosis process executed after a shock prediction according to the present embodiment.

Figure 15:
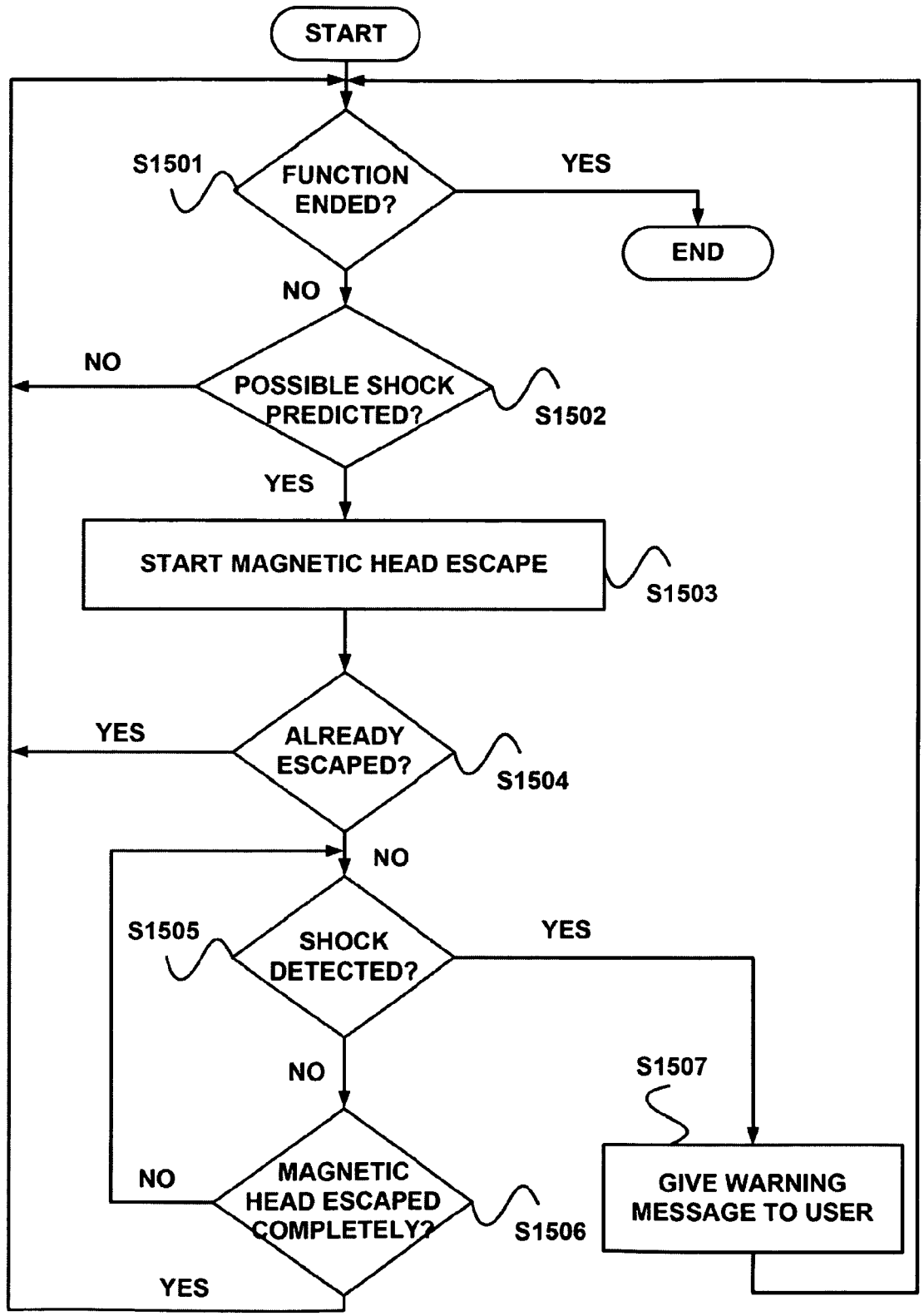
FIG. 15 is a flow chart illustrating the flow of a diagnosis process according to the present invention.

FIG. 15 is a flow chart illustrating the flow of a diagnosis process according to the present embodiment.

As shown in FIG. 15, when the shock prediction section 65 predicts the occurrence of a shock (steps 1501 and 1502), the HDD filter driver 33 issues an unload command to the magnetic disk device 10 in accordance with an escape request from the shock prediction section 65. Then, the magnetic head 11 starts an escape operation (step 1503).

Then, if the magnetic head position checking section 124 has controlled the diagnosis processing section 123, i.e. if the magnetic head 11 has already been unloaded, the diagnosis process is immediately ended (steps 1504 and 1501). Thus, if the magnetic head 11 has been unloaded before the magnetic head 11 starts an escape operation, the diagnosis process according to the present embodiment is ended without determining whether or not the magnetic head 11 could have escaped within the pre-shock period.

If the magnetic head 11 has been loaded and the magnetic head position checking section 124 has not controlled the diagnosis processing section 123, then the pre-shock period measurement section 121, the magnetic head escape completion time measurement section 122, and the diagnosis processing section 123 determine whether or not a shock has been detected before the magnetic head 11 escapes completely (steps 1505 and 1506).

If the magnetic head 11 has completed an escape operation before a shock is detected, then it is unlikely that the magnetic head 11 will collide against and damage the magnetic disk 12. Accordingly, the diagnosis process is ended (steps 1506 and 1501).

On the other hand, if a shock is detected before the magnetic head 11 completes an escape operation, the magnetic head 11 may have collided against and damaged the magnetic disk 12. Accordingly, a warning message is transmitted to the user (steps 1505 and 1507). Then, the diagnosis process is ended (step 1501).

As described above, according to the diagnosis process executed by the magnetic disk device 10 according to the present invention, if an actual shock follows a shock prediction, it is determined whether or nor the magnetic head 11 performed an escape operation in time. Then, if the magnetic head 11 may have collided against and damaged the magnetic disk 12, a corresponding warning is given to the user to prompt him or her to execute a recovery process such as data backup. That is, if the magnetic disk device or the information processing apparatus 100 has been shocked and it is unknown whether or not a fault is occurring in the operating magnetic disk device 10, then this can be determined with a specified accuracy.

It is thus possible to avoid a secondary fault in which the magnetic head 11 collides against the magnetic disk 12 to scrape the coated magnetic surface of the disk 12 and subsequently the resultant fine fragments of the surface farther damage the surface of the disk 12 while the magnetic disk 10 is operating, resulting in loss of more data.

In the above embodiments, the information processing apparatus 100 such as a notebook type computer is assumed. It goes without saying that the present embodiment is also applicable to a unitary magnetic disk device or various other devices such as a hard disk recorder which are provided with a magnetic disk device as a storage means.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A mechanical transport device comprising:
 a system for transport, wherein the system for transport is a vehicle; and
 a hard disk drive data storage system attached to said transport system, wherein
  the hard disk drive data storage system comprises:
  a magnetic recording disk to record data;
  a head to read or write the data to or from the disk; and
  a shock manager designed to detect a shock condition,
   wherein the hard disk drive data storage system performs the following operation upon detecting a shock condition: dividing an access request to said magnetic disk device into access requests with a smaller data size per access.

2. The mechanical transport device of claim 1, wherein sensing of the shock condition by the shock manager is changed adaptively.

3. The mechanical transport device of claim 1, wherein the shock condition includes or is derived from information from a sensor about an environmental condition of the hard disk drive data storage system.

4. A mechanical transport device comprising:
 a system for transport; and
 a hard disk drive data storage system attached to said transport system, wherein
  the hard disk drive data storage system comprises:
  a magnetic recording disk to record data;
  a head to read or write the data to or from the disk;
  a sensor designed to sense an environmental condition of the hard disk drive data storage system indicative of a shock condition; and a shock manager for detecting a shock condition based on information from the sensor,
  wherein the hard disk drive data storage system performs at least one of
  the following operations upon detecting a shock condition:
   dividing an access request to said magnetic disk device into access requests with a smaller data size per access, and
   causing the head to escape from the disk, wherein if the hard disk drive data storage system determines that a shock actually occurs after the head has been instructed to escape, the hard disk drive data storage system determines whether or not the magnetic head has escaped before the occurrence of the shock,
 wherein the hard disk drive data storage system further comprises:
  an information acquisition mechanism for acquiring current information about an environmental change of a magnetic disk device;
  a shock prediction mechanism for analyzing the current information acquired by said information acquisition mechanism together with a history thereof occurring immediately prior to the current information, and for determining a status of where said magnetic disk device is used, so as to perform a shock prediction; and
  a control mechanism for controlling operations of said magnetic disk device including a magnetic head escape operation based on a prediction result by said shock prediction mechanism,
  wherein the history analyzed is longer than an anticipated time required for a fall, wherein if a variation in the status where said magnetic disk device is used falls within a specified range for a specified period, said shock prediction mechanism does not predict that a shock will be caused by the variation in the status.

5. A mechanical transport device comprising:
 a system for transport; and
 a hard disk drive data storage system attached to said transport system, wherein
  the hard disk drive data storage system comprises:
  a magnetic recording disk to record data;
  a head to read or write the data to or from the disk;
  a sensor designed to sense an environmental condition of the hard disk drive data storage system indicative of a shock condition; and
  a shock manager for detecting a shock condition based on information from the sensor,
  wherein the hard disk drive data storage system performs at least one of the following operations upon detecting a shock condition:
   dividing an access request to said magnetic disk device into access requests with a smaller data size per access, and causing the head to escape from the disk, wherein if the hard disk drive data storage system determines that a shock actually occurs after the head has been instructed to escape, the hard disk drive data storage system determines whether or not the magnetic head has escaped before the occurrence of the shock, wherein the hard disk drive data storage system further comprises:
an information acquisition mechanism for acquiring current information about an environmental change of a magnetic disk device;
a shock prediction mechanism for analyzing the current information acquired by said information acquisition mechanism together with a history thereof occurring immediately prior to the current information, and for determining a status of where said magnetic disk device is used, so as to perform a shock prediction; and
a control mechanism for controlling operations of said magnetic disk device including a magnetic head escape operation based on a prediction result by said shock prediction mechanism,
wherein if the status of where said magnetic disk device is used varies in a predetermined pattern, said shock prediction mechanism predicts that a shock will be caused by the variation in the status.

6. A mechanical transport device comprising:
a system for transport; and
a hard disk drive data storage system attached to said transport system, wherein
the hard disk drive data storage system comprises:
a magnetic recording disk to record data;
a head to read or write the data to or from the disk;
a sensor designed to sense an environmental condition of the hard disk drive data storage system indicative of a shock condition; and
a shock manager for detecting a shock condition based on information from the sensor,
wherein the hard disk drive data storage system performs at least one of the following operations upon detecting a shock condition:
dividing an access request to said magnetic disk device into access requests with a smaller data size per access, and
causing the head to escape from the disk, wherein if the hard disk drive data storage system determines that a shock actually occurs after the head has been instructed to escape, the hard disk drive data storage system determines whether or not the magnetic head has escaped before the occurrence of the shock,
wherein the hard disk drive data storage system further comprises:
an information acquisition mechanism for acquiring current information about an environmental change of a magnetic disk device;
a shock prediction mechanism for analyzing the current information acquired by said information acquisition mechanism together with a history thereof occurring immediately prior to the current information, and for determining a status of where said magnetic disk device is used, so as to perform a shock prediction; and
a control mechanism for controlling operations of said magnetic disk device including a magnetic head escape operation based on a prediction result by said shock prediction mechanism,
wherein said shock prediction mechanism predicts a shock with reference to a history of input operations provided by a predetermined input device, wherein said input device is selected from a keyboard and a mouse coupled to a computer system which is in communication with the magnetic disk device.

7. A mechanical transport device comprising:
a system for transport; and
a hard disk drive data storage system attached to said transport system, wherein
the hard disk drive data storage system comprises:
a magnetic recording disk to record data;
a head to read or write the data to or from the disk;
a sensor designed to sense an environmental condition of the hard disk drive data storage system indicative of a shock condition; and
a shock manager for detecting a shock condition based on information from the sensor,
wherein the hard disk drive data storage system performs at least one of the following operations upon detecting a shock condition:
dividing an access request to said magnetic disk device into access requests with a smaller data size per access, and
causing the head to escape from the disk, wherein if the hard disk drive data storage system determines that a shock actually occurs after the head has been instructed to escape, the hard disk drive data storage system determines whether or not the magnetic head has escaped before the occurrence of the shock,
wherein the hard disk drive data storage system further comprises
an information acquisition mechanism for acquiring current information about an environmental change of a magnetic disk device;
a shock prediction mechanism for analyzing the current information acquired by said information acquisition mechanism together with a history thereof occurring immediately prior to the current information, and for determining a status of where said magnetic disk device is used, so as to perform a shock prediction; and
a control mechanism for controlling operations of said magnetic disk device including a magnetic head escape operation based on a prediction result by said shock prediction mechanism,
wherein said information acquiring mechanism acquires information on acceleration of said magnetic disk device, and said shock prediction mechanism recognizes the status where the magnetic disk device is used based on the acceleration information acquired by said information acquiring mechanism.

8. A mechanical transport device comprising:
a system for transport; and
a hard disk drive data storage system attached to said transport system, wherein
the hard disk drive data storage system comprises:
a magnetic recording disk to record data;
a head to read or write the data to or from the disk; and
a sensor designed to sense an environmental condition of the hard disk drive data storage system indicative of a shock condition; and
a shock manager for detecting a shock condition based on information from the sensor, wherein the hard disk drive data storage system performs at least one of the following operations upon detecting a shock condition:
  dividing an access request to said magnetic disk device into access requests with a smaller data size per access, and
  causing the head to escape from the disk, wherein if the hard disk drive data storage system determines that a shock actually occurs after the head has been instructed to escape, the hard disk drive data storage system determines whether or not the magnetic head has escaped before the occurrence of the shock,
wherein the hard disk drive data storage system further comprises:
  an information acquisition mechanism for acquiring current information about an environmental change of a magnetic disk device;
  a shock prediction mechanism for analyzing the current information acquired by said information acquisition mechanism together with a history thereof occurring immediately prior to the current information, and for determining a status of where said magnetic disk device is used, so as to perform a shock prediction; and
  a control mechanism for controlling operations of said magnetic disk device including a magnetic head escape operation based on a prediction result by said shock prediction mechanism,
  wherein if said shock prediction mechanism determines that said magnetic disk device is stable, the shock prediction mechanism notifies said control mechanism that said magnetic disk device is stable, and said control mechanism returns said escaping magnetic head in response to said notification, wherein said shock prediction mechanism adaptively determines whether or not said magnetic disk device is stable, based on a history of the information acquired by said information acquiring mechanism before a shock is predicted to occur.

9. A system for reading or writing data comprising:
a hard disk drive including:
  a magnetic recording disk to record data;
  a head to read or write the data to or from the disk; and
  a shock manager designed to detect a shock condition; and
wherein the shock manager detects the shock condition based on a shock value being over a predetermined threshold level,
  wherein the shock value is determined by combining values of a linear accelerometer and an angular speed sensor.

10. The system of claim 9, wherein the threshold level is automatically adjusted after being set by a user.

11. The system of claim 10, wherein the threshold level is automatically adjusted based on a condition including at least one of turning off of an LCD monitor, striking of a keyboard, and manipulating of a mouse.

12. The system of claim 10, wherein the threshold level is adjusted when the system detects a variation in acceleration with a particular pattern.

13. The system of claim 12, wherein the variation in acceleration is due to walking.

14. The system of claim 12, wherein the variation in acceleration is due to a fall from a lap of a user.

15. The system of claim 12, wherein the variation in acceleration is sampled with use of a variable clock.

16. The system of claim 12, wherein the variation in acceleration is detected with use of sampling at variable intervals.

17. A system for reading or writing data comprising:
a hard disk drive including:
  a magnetic recording disk to record data;
  a head to read or write the data to or from the disk; and
  a shock manager designed to detect a shock condition; and
wherein the shock manager detects the shock condition based on a shock value being over an adaptable threshold level set by a user,
  wherein the shock value is determined by combining values of a linear accelerometer and an angular speed sensor.

18. A system for reading or writing data comprising:
a hard disk drive including:
  a magnetic recording disk to record data;
  a head to read or write the data to or from the disk; and
  a sensor designed to sense environmental changes of the hard disk drive; and
  a shock manager for analyzing information from the sensor for predicting occurrence of a shock, wherein the shock manager determines occurrence of a shock based on a shock value being over a predetermined threshold, wherein the shock value is determined by combining values of a linear accelerometer and an angular speed sensor.

19. The system of claim 18, wherein the diagnosis includes reviewing head escape time velocity to determine if the magnetic recording disk includes defects.

* * * * *